US011734431B2

(12) United States Patent
AlGhamdi et al.

(10) Patent No.: US 11,734,431 B2
(45) Date of Patent: Aug. 22, 2023

(54) METHOD AND SYSTEM FOR ASSESSING EFFECTIVENESS OF CYBERSECURITY CONTROLS IN AN OT ENVIRONMENT

(71) Applicant: Saudi Arabian Oil Company, Dhahran (SA)

(72) Inventors: Khalid Suliman AlGhamdi, Dhahran (SA); Muhanad Abdulhamid Shahat, Dammam (SA)

(73) Assignee: SAUDI ARABIAN OIL COMPANY, Dhahran (SA)

( * ) Notice: Subject to any disclaimer, the term of this patent is extended or adjusted under 35 U.S.C. 154(b) by 437 days.

(21) Appl. No.: 16/859,632

(22) Filed: Apr. 27, 2020

(65) Prior Publication Data

US 2021/0334386 A1    Oct. 28, 2021

(51) Int. Cl.
*G06F 21/57* (2013.01)
*G06F 9/54* (2006.01)

(52) U.S. Cl.
CPC ............ *G06F 21/577* (2013.01); *G06F 9/542* (2013.01); *G06F 2221/034* (2013.01)

(58) Field of Classification Search
CPC ............... G06F 21/577; G06F 9/542; G06F 2221/034; G06F 21/554; G06F 21/55;
(Continued)

(56) References Cited

U.S. PATENT DOCUMENTS 8,595,831 B2 * 11/2013 Skare .................... G06F 21/577
434/118
8,856,936 B2 * 10/2014 Datta Ray ........... H04L 63/1408
726/25

(Continued)

FOREIGN PATENT DOCUMENTS

CA      3078261 A1 *  1/2020 ........... G06F 21/577
EP      3139318 A1    3/2017
(Continued)

OTHER PUBLICATIONS

Jamal N. Al-Karaki, GoSafe: On the practical characterization of the overall security posture of an organization information system using smart auditing and ranking, Mar. 7, 2020, Journal of King Saud University—Computer and Information Sciences, 17 pages (Year: 2020).*

Xuepeng Huang, Research on Network Security Evaluation System Based on Fuzzy Comprehensive Evaluation Method, 2017, Advances in Economics, Business and Management Research (AEBMR), vol. 26, International Conference on Economics, Finance and Statistics (ICEFS 2017), 5 pages (Year: 2017).*

(Continued)

*Primary Examiner* — Shahriar Zarrineh
(74) *Attorney, Agent, or Firm* — Leason Ellis LLP

(57) ABSTRACT

A cybersecurity solution for monitoring and assessing an overall cybersecurity posture level of an operation technology environment to increase the level when it is determined to be below a setpoint value for the operation technology environment. The solution includes, among other things, receiving metrics data for a corresponding one of each of a plurality of cybersecurity posture indices for the operation technology environment, determining a cybersecurity posture index value for each of the plurality of cybersecurity posture indices based on the metrics data, applying a weight to each of the plurality cybersecurity posture index values to calculate a respective weighted cybersecurity posture index value, and determining an overall cybersecurity posture level of the operation technology environment based on a sum of each weighted cybersecurity posture index value.

20 Claims, 5 Drawing Sheets

(58) Field of Classification Search
CPC .......... G06N 20/00; G06N 5/04; G06Q 50/06; G06Q 10/0635; H04L 63/1433
See application file for complete search history.

(56) References Cited

U.S. PATENT DOCUMENTS

| | | | | |
|---|---|---|---|---|
| 9,027,125 | B2* | 5/2015 | Kumar | H04L 63/0209 709/224 |
| 9,032,521 | B2* | 5/2015 | Amini | H04L 63/1433 726/25 |
| 9,292,695 | B1* | 3/2016 | Bassett | G06F 21/577 |
| 9,294,498 | B1* | 3/2016 | Yampolskiy | H04L 61/5076 |
| 9,299,048 | B2* | 3/2016 | Fang | G06Q 10/0635 |
| 9,684,923 | B2 | 6/2017 | Elberbaum | |
| 9,691,090 | B1* | 6/2017 | Barday | G06F 16/958 |
| 9,800,605 | B2* | 10/2017 | Baikalov | H04L 63/1433 |
| 10,149,169 | B1 | 12/2018 | Keller | |
| 10,210,470 | B2 | 2/2019 | Datta Ray | |
| 10,237,070 | B2 | 3/2019 | Lindemann | |
| 10,318,027 | B2 | 6/2019 | Beaumier et al. | |
| 10,341,108 | B1 | 7/2019 | Smayling et al. | |
| 10,404,737 | B1* | 9/2019 | Sweeney | G06F 16/2228 |
| 10,452,845 | B2 | 10/2019 | Mestha et al. | |
| 10,469,517 | B1 | 11/2019 | Higbee et al. | |
| 10,505,497 | B2 | 12/2019 | Bahr et al. | |
| 10,546,135 | B1* | 1/2020 | Kassoumeh | G06Q 10/0635 |
| 10,564,804 | B2 | 2/2020 | Rivera et al. | |
| 10,841,338 | B1* | 11/2020 | Lin | H04L 63/20 |
| 11,003,773 | B1* | 5/2021 | Fang | H04L 63/0263 |
| 11,005,860 | B1* | 5/2021 | Glyer | H04L 63/1433 |
| 11,140,193 | B2* | 10/2021 | Patel | G06F 21/577 |
| 11,201,890 | B1* | 12/2021 | Coull | H04L 63/1416 |
| 11,283,824 | B1* | 3/2022 | Berger | H04L 63/1416 |
| 2008/0189788 | A1* | 8/2008 | Bahl | H04L 63/1416 726/25 |
| 2009/0327000 | A1* | 12/2009 | Davis | G06Q 10/06375 705/7.28 |
| 2011/0126111 | A1* | 5/2011 | Gill | G06F 21/577 715/736 |
| 2013/0283336 | A1* | 10/2013 | Macy | G06F 21/577 726/1 |
| 2014/0137257 | A1* | 5/2014 | Martinez | H04L 63/1433 726/25 |
| 2014/0325662 | A1* | 10/2014 | Foster | H04L 63/20 726/25 |
| 2014/0375667 | A1* | 12/2014 | Reville | G06T 11/206 345/589 |
| 2016/0173521 | A1* | 6/2016 | Yampolskiy | H04L 61/4511 726/25 |
| 2016/0294854 | A1* | 10/2016 | Parthasarathi | H04L 63/1408 |
| 2016/0308898 | A1* | 10/2016 | Teeple | H04L 63/1441 |
| 2016/0359895 | A1 | 12/2016 | Chiu et al. | |
| 2017/0041331 | A1* | 2/2017 | Craig | H04L 63/1441 |
| 2017/0046192 | A1* | 2/2017 | Ivas | G06F 9/5083 |
| 2017/0237764 | A1* | 8/2017 | Rasumov | G06F 21/562 726/25 |
| 2017/0287034 | A1* | 10/2017 | Barday | G06Q 10/0635 |
| 2017/0359234 | A1* | 12/2017 | Gross | G06F 11/3476 |
| 2018/0020021 | A1* | 1/2018 | Gilmore | H04L 63/1441 |
| 2018/0124091 | A1* | 5/2018 | Sweeney | H04L 63/1425 |
| 2018/0270266 | A1* | 9/2018 | Zoldi | G06Q 10/0635 |
| 2019/0044969 | A1* | 2/2019 | Pilkington | H04L 63/1433 |
| 2019/0052664 | A1* | 2/2019 | Kibler | H04L 63/20 |
| 2019/0207968 | A1* | 7/2019 | Heckman | H04L 63/1425 |
| 2019/0253447 | A1* | 8/2019 | Sweeney | H04L 63/14 |
| 2019/0362280 | A1* | 11/2019 | Vescio | G06Q 10/0635 |
| 2020/0076831 | A1* | 3/2020 | Baughman | H04L 63/20 |
| 2020/0106801 | A1* | 4/2020 | Evans | H04L 63/1433 |
| 2020/0159888 | A1* | 5/2020 | Ghose | G06F 9/3842 |
| 2020/0250317 | A1* | 8/2020 | Gourisetti | G06F 21/577 |
| 2020/0274894 | A1* | 8/2020 | Argoeti | G06F 7/556 |
| 2020/0285737 | A1* | 9/2020 | Kraus | G06F 21/552 |
| 2020/0372154 | A1* | 11/2020 | Bacher | H04L 41/147 |
| 2021/0092156 | A1* | 3/2021 | Sharif | H04L 63/20 |
| 2021/0211452 | A1* | 7/2021 | Patel | H04L 63/1416 |
| 2021/0243208 | A1* | 8/2021 | Rubin | G06F 21/554 |
| 2021/0314333 | A1* | 10/2021 | Krisiloff | H04L 63/1416 |
| 2022/0159034 | A1* | 5/2022 | Volkov | G06F 21/552 |

FOREIGN PATENT DOCUMENTS

| | | | | |
|---|---|---|---|---|
| EP | 3179696 | A1 | 6/2017 | |
| EP | 3151153 | B1 * | 5/2021 | .......... G06F 21/577 |
| KR | 20150084851 | A * | 7/2015 | |
| WO | 2017139074 | A1 | 8/2017 | |
| WO | WO-2019081181 | A1 * | 5/2019 | ........ G06Q 10/0635 |
| WO | WO-2020089532 | A1 * | 5/2020 | ............ G06F 21/57 |

OTHER PUBLICATIONS

Fabro, Mark. "Gorski and Nancy Spiers,". "Recommended Practice: Improving Industrial Control System Cybersecurity with Defense-in-Depth Strategies," DHS ICS-CERT (2016).

Force, Joint Task, and Transformation Initiative. "Security and privacy controls for federal information systems and organizations." NIST Special Publication 800.53 (2013): 8-13.

International Search Report and Written Opinion in corresponding PCT Application No. PCT/US2021/029330 dated Aug. 3, 2021.

* cited by examiner

METHOD AND SYSTEM FOR ASSESSING EFFECTIVENESS OF CYBERSECURITY CONTROLS IN AN OT ENVIRONMENT

FIELD OF THE DISCLOSURE

The present disclosure relates to a system, method and computer program for measuring, monitoring, evaluating and assessing cybersecurity controls in an operational technology (OT) environment, and for measuring and assessing effectiveness of cybersecurity controls in the OT environment, including underlying industrial control systems (ICSs), as well as an overall security posture of the OT environment.

BACKGROUND OF THE DISCLOSURE

Operational technology (OT) is an integral part of critical infrastructures, helping to facilitate operations in vital industries such as electricity, oil and gas, water, wastewater treatment, transportation, and manufacturing. The growing issue of cybersecurity and its impact on OT environments presents fundamental risks to enterprise and their operations, including private and public enterprises. Effectively addressing OT cybersecurity issues requires a clear understanding of the overall security posture for a given OT environment and the security challenges facing it. There exists an urgent and unmet need for a cybersecurity solution that can assess the security posture of an OT environment in real or near real-time and identify cybersecurity issues in the OT environment.

SUMMARY OF THE DISCLOSURE

The solution includes a system, method and computer program for measuring, monitoring, evaluating and assessing an overall cybersecurity posture for an OT environment, including cybersecurity controls in the OT environment. The present disclosure provides a cybersecurity solution that can measure, monitor, evaluate and assess the overall cybersecurity posture for the OT environment and identify issues or vulnerabilities that can potentially expose the OT environment to cyberthreats or cyberattacks. The solution can measure, monitor, evaluate and assess cybersecurity controls included in the OT environment, including underlying industrial control systems (ICSs). The solution can include guiding or effectuating resolution or remediation of identified issues or vulnerabilities to ameliorate the overall cybersecurity posture of the OT environment to a cybersecurity posture level above a predetermined threshold level. The solution can include guiding or effectuating effective resolution or remediation actions in a timely manner.

In a nonlimiting embodiment, the solution includes a method for monitoring and assessing an overall cybersecurity posture level of an operation technology environment to increase the level when it is determined to be below a setpoint value for the operation technology environment. The method comprises: receiving metrics data for a corresponding one of each of a plurality of cybersecurity posture indices ($CPI_i$) for the operation technology environment; determining a cybersecurity posture index ($CPI_i$) value for each of the plurality of cybersecurity posture indices ($CPI_i$) based on the metrics data; applying a weight to each of the plurality cybersecurity posture index ($CPI_i$) values to calculate a respective weighted cybersecurity posture index ($wCPI_i$) value; determining an overall cybersecurity posture level of the operation technology environment based on a sum of each weighted cybersecurity posture index ($wCPI_i$) value; generating a notification message, including image rendering data and commands; and sending the notification message to a computer resource asset to render an image of a snapshot cybersecurity posture level for at least one of the plurality of cybersecurity posture indices ($CPI_i$). The method can further comprise: effectuating remediation based on the overall cybersecurity posture level of the operation technology environment; or effectuating remediation based on the snapshot cybersecurity posture level.

In the method, the snapshot cybersecurity posture level can include a near-real-time (NRT) snapshot cybersecurity posture level.

In the method, the overall cybersecurity posture level of the operation technology environment can include a near-real-time (NRT) snapshot overall cybersecurity posture level.

In the method, the snapshot cybersecurity posture level can include a near-real-time (NRT) snapshot cybersecurity posture level for at least one of: a number of users authorized access to the operation technology environment; a network security level for the operation technology environment; a number cyber awareness sessions performed on the operation technology environment; a number of cyber drills performed on the operation technology environment; a number of cybersecurity incidents in the operation technology environment; a patch compliance ratio for computer resource assets in the operation technology environment; a backup availability ratio for computer resource assets in the operation technology environment; and an endpoint security compliance ratio for computer resource assets in the operation technology environment.

In the method, effectuating remediation can include fixing a vulnerability on a computer resource asset in the operation technology environment.

In the method, effectuating remediation can include guiding, on said computer resource asset, mitigation of a vulnerability on a different computer resource asset in the operation technology environment.

In another nonlimiting embodiment, the solution include a non-transitory computer readable storage medium having stored thereon instructions for monitoring and assessing an overall cybersecurity posture level of an operation technology environment that, when executed by a computing device, cause the computing device to perform operations comprising: receiving metrics data for a corresponding one of each of a plurality of cybersecurity posture indices ($CPI_i$) for the operation technology environment; determining a cybersecurity posture index ($CPI_i$) value for each of the plurality of cybersecurity posture indices ($CPI_i$) based on the metrics data; applying a weight to each of the plurality cybersecurity posture index ($CPI_i$) values to calculate a respective weighted cybersecurity posture index ($wCPI_i$) value; determining an overall cybersecurity posture level of the operation technology environment based on a sum of each weighted cybersecurity posture index ($wCPI_i$) value; generating a notification message, including image rendering data and commands; and sending the notification message to a computer resource asset to render an image of a snapshot cybersecurity posture level for at least one of the plurality of cybersecurity posture indices ($CPI_i$).

In the non-transitory computer readable storage medium, the instructions, when executed by the computing device, can cause the computing device to perform a further operation comprising: effectuating remediation based on the overall cybersecurity posture level of the operation technology environment; or effectuating remediation based on the snapshot cybersecurity posture level.

In the non-transitory computer readable storage medium: the snapshot cybersecurity posture level can include a near-real-time (NRT) snapshot cybersecurity posture level; the overall cybersecurity posture level of the operation technology environment can include a near-real-time (NRT) snapshot overall cybersecurity posture level; or the snapshot cybersecurity posture level can comprise a near-real-time (NRT) snapshot cybersecurity posture level for at least one of: a number of users authorized access to the operation technology environment; a network security level for the operation technology environment; a number cyber awareness sessions performed on the operation technology environment; a number of cyber drills performed on the operation technology environment; a number of cybersecurity incidents in the operation technology environment; a patch compliance ratio for computer resource assets in the operation technology environment; a backup availability ratio for computer resource assets in the operation technology environment; and an endpoint security compliance ratio for computer resource assets in the operation technology environment.

In the non-transitory computer readable storage medium, effectuating remediation can include fixing a vulnerability on a computer resource asset in the operation technology environment or guiding, on the computer resource asset, mitigation of a vulnerability on a different computer resource asset in the operation technology environment.

In another embodiment, the solution includes a system for monitoring and assessing an overall cybersecurity posture level of an operation technology environment to increase the level when it is determined to be below a setpoint value. The system comprises: a cybersecurity posture assessment and remediation (CPAR) stack arranged to receive metrics data for a corresponding one of each of a plurality of cybersecurity posture indices ($CPI_i$) for the operation technology environment, and determine a cybersecurity posture index ($CPI_i$) value for each of the plurality of cybersecurity posture indices ($CPI_i$) based on the metrics data; and a key performance index (KPI) determiner arranged to apply a weight to each of the plurality cybersecurity posture index ($CPI_i$) values to calculate a respective weighted cybersecurity posture index ($wCPI_i$) value, determine an overall cybersecurity posture level of the operation technology environment based on a sum of each weighted cybersecurity posture index ($wCPI_i$) value, generate a notification message, including image rendering data and commands, and send the notification message to a computer resource asset to render an image of a snapshot cybersecurity posture level for at least one of the plurality of cybersecurity posture indices ($CPI_i$).

In the system, the cybersecurity assessment and remediation (CPAR) stack can include at least one of: a cybersecurity incidence level metrics (CILM) unit; a backup Availability Ratio Metrics (BARM) unit; a Patch Compliance Ratio Metrics (PCRM) unit; an Endpoint Compliance Ratio Metrics (ECRM) unit; a Network Security Level Metrics (NSLM) unit; a Security Awareness Level Metrics (SALM) unit; and a Drill Compliance Level Metrics (DCLM) unit.

The system can further comprise an operation technology key performance index mitigation unit arranged to effectuate remediation of a vulnerability on a computer resource asset in the operation technology environment to increase said snapshot cybersecurity posture level for the at least one of the plurality of cybersecurity posture indices (CPIi). The effectuate remediation can include guiding remediation of the vulnerability on the computer resource asset.

Additional features, advantages, and embodiments of the disclosure may be set forth or apparent from consideration of the detailed description and drawings. Moreover, it is to be understood that the foregoing summary of the disclosure and the following detailed description and drawings provide non-limiting examples that are intended to provide further explanation without limiting the scope of the disclosure as claimed.

BRIEF DESCRIPTION OF THE DRAWINGS

The accompanying drawings, which are included to provide a further understanding of the disclosure, are incorporated in and constitute a part of this specification, illustrate embodiments of the disclosure and together with the detailed description explain the principles of the disclosure. No attempt is made to show structural details of the disclosure in more detail than may be necessary for a fundamental understanding of the disclosure and the various ways in which it may be practiced.

Figure 1:
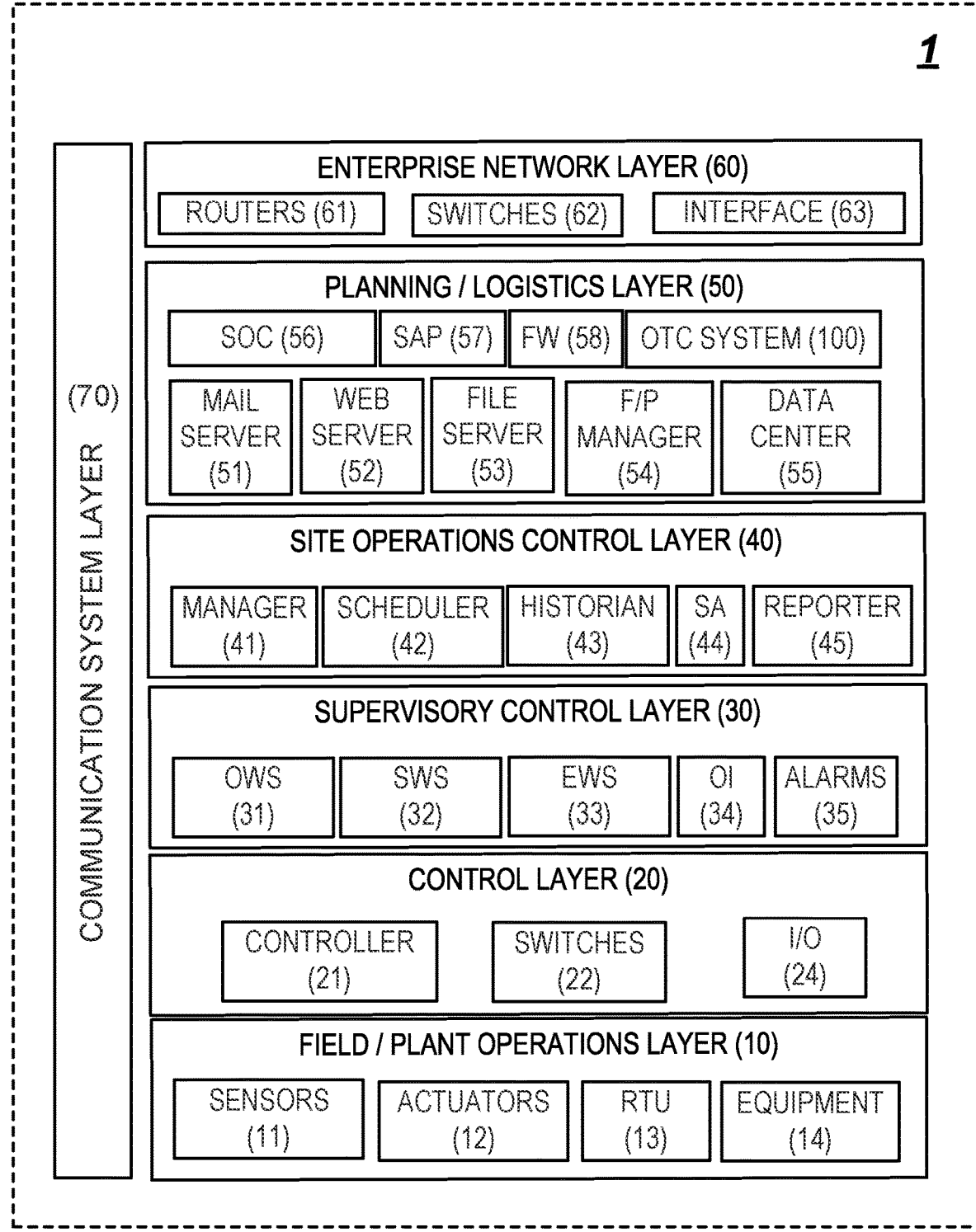
FIG. 1 shows a nonlimiting embodiment of an Operation Technology (OT) environment provided with the cybersecurity solution.

The present disclosure is further described in the detailed description that follows.

DETAILED DESCRIPTION OF THE DISCLOSURE

The disclosure and its various features and advantageous details are explained more fully with reference to non-limiting embodiments and examples described or illustrated in the accompanying drawings and detailed in the following description. It should be noted that features illustrated in the drawings are not necessarily drawn to scale, and features of one embodiment can be employed with other embodiments as those skilled in the art would recognize, even if not explicitly stated. Descriptions of well-known components and processing techniques can be omitted so as not to unnecessarily obscure the embodiments of the disclosure. The examples used are intended merely to facilitate an understanding of ways in which the disclosure can be practiced and to further enable those skilled in the art to practice the embodiments of the disclosure. Accordingly, the examples and embodiments should not be construed as limiting the scope of the disclosure. Moreover, it is noted that like reference numerals represent similar parts throughout the several views of the drawings.

Generally, operational technology (OT) includes a category of computing and communication systems whose primary purpose includes managing, monitoring or controlling industrial or manufacturing operations with a focus on the physical devices and processes used in such operations. In a broader sense, OT can include any hardware or software that can be used to run, manage or control equipment in a factory, plant, facility, field or other operational structure or area. OT can include, for example, industrial control systems (ICS), supervisory control and data acquisition (SCADA) systems, distributed control systems (DCS), programmable logic controls (PLC), predictive insights (PI) systems, computer numerical controls, remote terminal units (RTUs), communication links, or any other equipment needed to run, manage, monitor or control operations in the OT environment. OT can include hardware or software dedicated to detecting or causing changes in physical processes through direct monitoring or control of physical devices, such as, for example, valves, pumps, motors, and sensors.

In the past, OT environments in industries, such as, for example, electricity, oil and gas, water, wastewater treatment, transportation, or manufacturing, among others, were isolated or made inaccessible to all but a few employees who needed access to the OT for operation or management. Many OT environments used obscure or proprietary protocols that were largely considered hack-proof. It was not uncommon for an OT environment to be disconnected and separate from the general computer network of an enterprise. As result, cybersecurity was less of a concern in the past.

However, more recently, there has been increasing concern regarding the potential for cyber-based attacks on critical infrastructures, and the number of cyber-based incidents across critical infrastructure sectors has risen significantly. The threat of an intrusion by malicious actors on critical infrastructure using computer-based exploits has also grown. State-of-the art OT enterprises have become especially vulnerable to cyberthreats or cyberattacks, since many of them interconnect their OT infrastructure with auxiliary applications and eco-systems using commercial off-the-shelf hardware and software, such as, for example, Ethernet, Windows, SQL, to name only a few. Implementation of such commercial off-the-shelf technology can introduce serious risks to the OT enterprise, including cybersecurity-related risks. As a matter of fact, advanced cybersecurity attacks are being developed every day to target systems such as PLCs, DCS controllers, RTUs, SCADAs, and event input-output (I/O) interfaces, as in, for example, the recent Triton ICS malware attack. The availability of OT-focused cybersecurity solutions has not kept up with the mounting cyberthreats or cyberattacks on OT environments. Indeed, a number of recent high-profile incidents have increased awareness of such threats and attacks, as well as the individuals or groups who pursue them with malicious intent.

Since the impact of a cybersecurity breach in an OT environment can be devastating to enterprise or the underlying infrastructure, strict cybersecurity controls must be applied and measured at all times. The cybersecurity impact on OT environments can be tremendous where the OT requires a delicate balance between safety and security to protect and maintain necessary availability. As a result, implementing cybersecurity controls is very important and should be applied without any delay. However, to achieve the needed security confidence level, enterprises should measure, monitor and assess their applied controls effectiveness. An overall cybersecurity posture assessment for the OT environment can either provide an enterprise with confidence that its cybersecurity controls are fully operational and effective, or identify individual or groups of computing resources assets in the OT environment that might warrant additional investigation or remediation using near-real-time (NRT) snapshot metrics based on established Cybersecurity Posture Indices (CPI).

An urgent and critical need exists for a cybersecurity solution that can measure, monitor, evaluate and assess the overall cybersecurity posture of an OT environment, and that can provide guidance or effectuate corrective actions to mitigate cybersecurity risks such that the overall cybersecurity posture increases above a predetermined, acceptable threshold level. This disclosure addresses such needs and others that might arise in the future by providing a solution that can measure, monitor, evaluate and assess the overall cybersecurity posture of an OT environment, and where it determines necessity, effectively guide or effectuate mitigation such as resolution or remediation of identified issues or vulnerabilities in the OT to ameliorate the overall cybersecurity posture of the OT environment to levels above the predetermined threshold level. The solution can include risk mitigation by guiding or effectuating resolution or remediation actions in the OT environment in a real-time or near real-time manner, such as, for example, by remediating vulnerabilities in one or more computing resource assets, scheduling user cybersecurity training sessions, modifying policies or rules, modifying access rights or privileges, causing computer resource assets to go offline or shut-down, or dispatching security personnel to individual or groups of computer resource assets, such as, for example, through alerts or notifications.

The solution includes establishing a plurality of Cybersecurity Posture Indices ($CPI_i$) and measuring, monitoring, evaluating and assessing the effectiveness of cybersecurity controls in the OT environment for each $CPI_i$ to determine a Cybersecurity Indicator Metric ($CIM_j$) value for each $CPI_i$, where $CPI_i$ can be an aggregate of one or more $CIM_j$ values, and where i and j are positive non-zero integers and j is equal to or greater than i. In the nonlimiting embodiment described in the instant disclosure, $CPI_i=CIM_i$ and i=j. The solution can include communicating each $CIM_j$ value to a computer resource asset, such as, for example, a computing device (not shown) in a Security Operations Center (SOC) 56 (shown in FIG. 1). The solution can include communicating a near-real-time (NRT) snapshot for each $CPI_i$, as well as an overall cybersecurity posture value for the OT environment. The solution can include determining the overall cybersecurity posture for the OT environment as a Key Performance Indicator ($KPI_{OT}$) value based on an aggregate of all $CIM_i$ values for the OT environment. The $KPI_{OT}$ value can be determined for the OT environment by weighting the $CIM_j$ value for each $CPI_i$ to generate a weighted $CIM_j$ value for the $CPI_i$ and aggregating the values.

As organizations establish a good understanding over time of their cybersecurity measures to reach higher cybersecurity maturity posture levels, the number of cybersecurity controls is also expected to increase. The solution can adapt and measure such a change easily by introducing a new CPI to measure the new OT cybersecurity control and calculate it to the overall CIM. The CIM can follow the same technique for measuring previous CPIs. The following lifecycle steps can be used, for example, during populating a CPI:

1. Identify CPI: CPI can be aligned with business objective and goals (for example, Gas Plant objective is to supply Gas product). The solution can start small and build the CPI/CIM as the OT environment evolves. The developed CPI can be arranged to be scalable and simple to understand by non-technical stakeholders, users or decision makers. A specialized CPI interface can be used for each CPI, which can include a field, for example, for each of the following: CPI name, version, description, question to be asked, answer, formula of the CPI, measuring unit, frequency of collecting the data, and time of visualization.

2. Create Sources: Once a CPI has been identified, the solution can link the CPI with data sources to populate the CIM. The solution can build a baseline of existing resources (for example, number of servers, printers, workstations, network devices, etc.).
3. Implement CPI: The next step in the solution can be to populate a table for each CPI to build a definition table. The solution can automate the collection of metrics; whenever possible.
4. Present Result: The solution can consolidate all relevant information and generate a report where all information can be presented in a graphical format.
5. Adjust and update metrics: The solution, including the KPI methodology can be reviewed periodically, for example, once a year to gauge progress. The solution can include a feedback mechanism to receive feedback from users to improve the underlying formulas to scale for other technologies.

Although a single Cybersecurity Posture Index $CPI_i$ can be based on one or more Cybersecurity Indicator Metrics $CIM_j$ (for example, j>i) in the following nonlimiting embodiment the $CPI_i$ is based on a single corresponding $CIM_i$ (that is, j=i) and $CPI_i=CIM_i$. Each $CIM_j$ ($CPI_i$) can include, for example, a numerical value between 0 and 100. In the nonlimiting embodiment, the $CPI_i$ can be established for an OT environment, where i=1, 2, 3, 4, 5, 6 and 7, and determined, as follows:

$CPI_1$: The first Cybersecurity Posture Index $CPI_1$ can include a cybersecurity incidence level for the entire OT environment, wherein the $CPI_1$ value can be determined by dividing the total number of incidents on the OT environment ($I_{Total}$) in a period of time ($T_{Period}$) by a baseline ($I_{Baseline}$) during the same period (where $T_{period}$ is measured in units of milliseconds, seconds, minutes, hours, days, weeks or longer) and subtracting one from the result.

$$CPI_1 = I_{Total}/I_{Baseline} - 1 \quad (Eq. 1)$$

$CPI_2$: $CPI_2$ can include a backup availability ratio for critical computer resource assets in the OT environment deemed, wherein the $CPI_2$ value can be determined by dividing the total number of computer resource assets in the OT environment deemed critical for which a backup computer resource asset is available ($BCCRA_{Total}$) by the total number of computer resource assets deemed critical ($CCRA_{Total}$), and multiplying the result by 100.

$$CPI_2 = BCCRA_{Total}/CCRA_{Total} \times 100 \quad (Eq. 2)$$

$CPI_3$: $CPI_3$ can include a patch compliance ratio for the computer resource assets in the OT environment, wherein the $CPI_3$ value can be determined by dividing the total number of computer resource assets in the OT environment that are determined to be compliant with all applicable patch policies ($PCRA_{Total}$) by the total number of computer resource assets online ($ACRA_{Total}$), and multiplying the result by 100.

$$CPI_3 = PCRA_{Total}/CRA_{Total} \times 100 \quad (Eq. 3)$$

$CPI_4$: $CPI_4$ can include an endpoint compliance ratio for the computer resource assets in the OT environment, wherein the $CPI_4$ value can be determined by dividing the total number of endpoint computer resource assets in the OT environment ($ECRA_{Total}$) that are determined to be compliant with the applicable endpoint protection policy by the total number of computer resource assets online ($ACRA_{Total}$), and then dividing the result by the total number of security tools (k) and multiplying 100, according to the following equations Eq. 4 and Eq. 5.

$$ECRA_{Total} = \Sigma ECRA_1 + ECRA_2 + \ldots + ECRA_k \quad (Eq. 4)$$

$$CPI_4 = (ECRA_{Total}/ACRA_{Total})/k \times 100 \quad (Eq. 5)$$

where k is a positive non-zero integer equal to the number of endpoint security tools that are on the $ECRA_{Total}$ and compliant with endpoint protection policies for the OT environment.

$CPI_5$: $CPI_5$ can include a network security level for the computer resource assets, wherein the $CPI_5$ value can be determined by calculating the total number of computer resource assets that are connected to a network ($NCRA_{Total}$) and summing a weighted ratio ($R_{DCH}$) of such assets that have a hardened device configuration ($DCH\text{-}CRA_{Total}$) and a weighted ratio ($R_{FCH}$) of such assets that have a hardened firewall policy ($FCH\text{-}CRA_{Total}$).

$$R_{DCH} = DCH\text{-}CRA_{Total}/NCRA_{Total} \quad (Eq. 6)$$

$$R_{FCH} = FCH\text{-}CRA_{Total}/NCRA_{Total} \quad (Eq. 7)$$

$$CPI_5 = \Sigma R_{DCH} \times C_1 + R_{FCH} \times C_2 \quad (Eq. 8)$$

where $C_1$ and $C_2$ are numerical values between 0 and 1 whose sum equals 1.0 at all times. In a nonlimiting example $C_1=0.60$ and $C_2=0.40$, and $C_1$ (0.60)+$C_2$ (0.40)=1.00.

$CPI_6$: $CPI_6$ can include a security awareness level for users of the computer resource assets, wherein the $CPI_6$ value can be determined by dividing the total number of actual security awareness sessions ($T_{SAct}$) that have been conducted during a period of time (for example, the year-to-date total) by the total number of sessions recommended ($T_{SRec}$) during the same time period, multiplied by 100.

$$CPI_6 = T_{SAct}/T_{SRec} \times 100 \quad (Eq. 9)$$

$CPI_7$: $CPI_7$ can include a drill compliance level, wherein the $CPI_7$ value can be determined by dividing the total number of disaster or cybersecurity drills ($T_{Drill}$) that have been conducted during a period of time (for example, the year-to-date total) by the total number of expected drills sessions ($T_{SetDrills}$) during the same time period, multiplied by 100.

$$CPI_7 = T_{Drill}/T_{SetDrills} \times 100 \quad (Eq. 10)$$

The $KPI_{OT}$ value for the OT environment can be determined by adjusting each $CPI_i$ by a respective weight $W_i$ and aggregating all the weighted CPIs, that is $$KPI_{OT} = \Sigma W_i \cdot CPI_i \quad (Eq. 11)$$

where $W_i$ is a numerical value between 0 and 1 and an aggregate sum of the entire series of values (for example, $\Sigma W_1 + \ldots + W_7 = 1.0$) equals 1.00 at all times. Each weight $W_i$ can be determined based on the importance of the CM in the particular OT environment. For instance, for a nonlimiting example of an OT environment in the oil and gas industry, the weights can be set as follows: $W_1=0.15$; $W_2=0.15$; $W_3=0.15$; $W_4=0.25$; $W_5=0.10$; $W_6=0.10$; and $W_7=0.10$.

Those skilled in the art will understand that fewer than seven, or more than seven Cybersecurity Posture Indices ($CPI_i$) can be established for an OT environment, including all computer resource assets in the OT environment, or a targeted category of the computer resource assets, such as, for example, those assets in the OT environment that are deemed critical, or those assets that are accessible from outside the OT environment, or those assets that are online or active, or assets that can be categorized according any other criteria that can affect the overall cybersecurity posture of the OT environment.

FIG. 1 shows a nonlimiting embodiment of an OT environment 1 provided with the cybersecurity solution. The OT environment 1 can include a plurality of layers, including, for example, a field or plant operations layer 10, a control layer 20, a supervisory control layer 30, a site operations control layer 40, a planning or logistics layer 50, and an enterprise network layer 60. Each of the layers 10 to 60 can be connected to a communication system layer 70.

The field or plant operations layer 10 can include a variety of sensors 11 and actuators 12 that are involved in the basic operations or processes of the field or plant. The field or plant can include for example, a utility plant, a manufacturing plant, an oil or gas field, an oil or gas production plant, or any other industrial, commercial, or production plant or field. The field/plant operations layer 10 can include remote terminal units (RTU) 13 or other equipment 14 needed to perform the operations or processes of the field or plant. The RTU 13 can include a sensor, a computing device or a communicating device. The equipment 14 can include any other device or process, other than the sensor 11, actuator 12, or RTU 13, needed to perform the operations or processes.

The sensors 11 can include devices or computer resource assets for measuring, monitoring or reporting a wide variety of parameters relating to operations, processes, personnel, or facilities. The sensors 11 can include, for example, fluid level sensors or meters, temperature sensors, pressure sensors, humidity or moisture sensors, fluid velocity sensors, fluid flow sensors, fluid or gas leak sensors, vibration sensors, geolocation sensors, intrusion sensors, image pickup devices, sound pickup devices, light sensors, radiation sensors, electric field sensors, magnetic field sensors, wind sensors, or any other sensor devices that can be used in or facilitate operations or processes in the field or plant.

The actuators 12 can include any device or computer resource asset for performing basic operations or processes in the field or plant. The actuators 12 can include, for example, switches, relays, pumps, valves, motors, engines, robots, or any device capable of performing an operation or process in the field or plant.

The control layer 20 can include controllers 21, switches 22, or input-output (I/O) interface devices 24. The controllers 21 can be arranged to direct or manipulate an operation or process performed in the field/plant operations layer 10 by, for example, interfacing with the sensors 11, actuators 12, RTUs 13, or equipment 14. The controllers 21 can include, for example, a PLC, DCS, field data acquisition (FDA) server, or flow computer (FC). The controllers 21 can be arranged to run an industry specific operating system, which can be programmed or configured from, for example, engineering workstation (EWS) 33 in the supervisory control layer 30. The controllers 20 can include: a computing device that can compute all the data and execute the program loaded to it; a network interface that can communicate with the devices or computer resource assets in the field/plant operations layer 10 or the supervisory control layer 30. The controllers 21 can include a separate power source that can supply power to all the controllers 21.

The controllers 21 can be arranged to make basic decisions based on feedback from the devices or computer resource assets in the field/plant operations layer 10, such as, for example, the sensors 11, actuators 12, RTUs 13, or equipment 14. The controllers 21 can be arranged to communicate with each other or with devices or computer resource assets in the supervisory control layer 30 (such as, for example, an operator workstation (OWS) 31, supervisor workstation (SWS) 32, engineering workstation (EWS) 33, input-output (OI) interface 34 or alarm system 35) or the site operations control layer 40 (such as, for example, the manager 41, scheduler 42, historian 43, security appliance (SA) 44, or reporter 45). The controllers 21 can be arranged to translate high-level parameters or commands into executable orders, consolidating the input-output (JO) traffic from the devices or computer resource assets, and transmitting IO data to a variety of nodes in the OT environment 1, including computer resource assets located in layers 30 to 70.

During operation, the controllers 21 can generate data traffic that can travel anywhere in the OT environment 1, including, for example, to or from the devices or computer resource assets in the operations layer 10, supervisory control layer 30, or site operations control layer 40. The switches 22 and I/O interfaces 24 can be arranged to route the data traffic between the various devices or computer resource assets in the various layers of the OT environment 1.

The supervisory control layer 30 can include the computer resource assets associated with runtime supervision or operation of the computer resource assets in layers 10 or 20. The supervisory control layer 30 can include computer resource assets such as control room workstations comprising the operator workstations (OWSs) 31, supervisor workstations (SWSs) 32, or engineer workstations (EWSs) 33. The layer 30 can include input-output (OI) interfaces 34 or alarm systems 35. The OI 34 can include, for example, a human-machine-interface (HMI).

Depending on the type or size of the field or plant operated in the OT environment 1, the computer resource assets in layer 30 can be included in the site operations control layer 40 or provided separately as the supervisory control layer 30, as seen in FIG. 1. The computer resource assets in layer 30 can be arranged to communicate with the controllers 21 in layer 20, or interface or share data with the site operations control layer 40, planning/logistics layer 50 or enterprise network layer 60. The computer resource assets can be arranged to communicate through one or more demilitarized zones (DMZs) in the OT environment. The computer resource assets can be arranged as dedicated operator interface terminals or on standard computing equipment and operating systems commonly used in ICSs, such as, for example, Microsoft Windows, Linux, IBM, IRIX, UNIX or UNICOS. The computer resource assets can be configured to communicate with standard Ethernet or TCP/IP protocols.

All the computer resource assets that might be necessary to perform the operations or processes of the field or plant can be included in the layers 10, 20 and 30. These three layers can include all the devices and computer resource assets necessary for conducting operations or processes, including measurement, monitoring, evaluation and assessment of operations parameters, and controlling the filed or plant floor operations. The operations or processes performed in or by the computer resource assets in layers 10, 20 and 30 can be aligned with or managed by the computer resource assets in layers 50 or 60. In a nonlimiting embodiment of the OT environment 1, the layers 10, 20, 30 and 40 can be logically separated and protected from layers 50 or 60.

The planning and logistic layer 50 can include the computer resource assets for the centralized information technology (IT) systems in the OT environment 1. The layer 50 can include the computer resource assets needed for cybersecurity measurement, monitoring, evaluation or assessment, including the computer resource assets in the Security Operations Center (SOC) 56 and OTC system 100. The layer 50 can include the computer resource assets needed to provide resources and services provided in or through the enterprise network layer 60, including, for example, wired or wireless access to enterprise network products or services. The enterprise network products or services can include, for example, access to email, the Internet, system applications and products (SAP), datacenters, or non-critical field or plant systems, such as, for example, field or plant reporting systems that report on inventory, performance or other metrics necessary for efficient and effective operation of the field or plant. The computer resource assets can be arranged to carry out basic business administration functions and IT services.

The layer 50 can be arranged as a separate layer, as seen in FIG. 1, or integrated with the enterprise network layer 60. The layers 50 or 60 can be under management or control of an IT organization in the enterprise. Because of their more open architecture (as compared to the computer resource assets in layers 10 to 30), the computer resource assets in layers 50 or 60 can have the greatest exposure to cybersecurity threats or attacks, which could potentially disrupt operations or processes of the OT environment 1. The computer resource assets in the layer 50 can be arranged to receive summarized data or information from the layers 10, 20 or 30 in the OT environment 1. A significant portion (for example, more than 75%) of data traffic in layers 50 and 60 can be dedicated to network traffic to or from the internet or datacenters.

The layer 50 can include a plurality of computer resource assets, as seen in FIG. 1. The layer 50 can include a server farm having, for example, a mail server, a web server 52, a file server 53, a field or plant (F/P) manager server 54, a datacenter 55, a systems applications and products (SAP) server 57, or a firewall (FW) server 58. The layer 50 can include the SOC 56, which can include computer resource assets, such as, for example, security analyst workstations, servers, or HMIs. The layer 50 can include the OTC system 100 (discussed in greater detail below). The SOC 56 or OTC system 100 can be include in layer 50 (as seen in FIG. 1) or layers 40 or 60. The SOC 56 or OTC 100 can be located outside of the OT environment 1.

The datacenter 55 can include or more database servers (not shown). The layer 50 can include one or more buses (not shown).

The computer resource assets in the layer 50 and, more generally, the OT environment 1 can be interconnected by communication links (not shown). The communication links (not shown) or buses (not shown) can be included in the communication system layer 70.

The enterprise network layer 60 can include a plurality of computer resource assets that are arranged or configured to communicate with computer resource assets located in the OT environment 1, or located external to the OT environment 1, such as, for example, on the Internet or on a separate network (not shown).

The computer resource assets in layer 60 can include computer resource assets that are dedicated to enterprise resource management, business-to-business functions, business-to-customer services, or other high level functions or services performed at the enterprise level. External partners or guests can access computer resource assets in the OT environment 1 through computer resource assets in layer 60. Although the OT environment 1 can be arranged to allow access by external partners or guests to computer resource assets in layers 40 or 50 for added flexibility, such arrangements can expose the OT environment to significantly increased risk of cybersecurity attacks or threats.

The computer resource assets in the layers 50 or 60 can be arranged to communicate with computer resource assets in the lower layers, such as, for example, in the ICS, SCADA, DCS, or PLC systems to exchange data, such as, for example, operations, field, plant, manufacturing, inventory or resource data. Direct access by a computer resource asset located outside of the OT environment 1 to any lower-layer computer resource asset (for example, in layers 10, 20 or 30) should be prevented. If, however, such access should become necessary, such as, for example, for remote access for management of a particular computer resource asset or system of assets by an employee or partner such as a system integrator or machine builder, then the access should be managed and controlled through a demilitarized zone (DMZ).

The computer resource assets in layer 60 can include routers 61, switches 62 and input-output interfaces 63. As previously noted, the enterprise network layer 60 can be integrated with the planning and logistics layer 50, or structured as a separate layer, as seen in FIG. 1. The layer 60 can include one or more modems (not shown) configured for one or more computer or communication network standards. The layer 60 can include one or more switching and distribution layers, including, for example, a core layer and a distribution layer. Alternatively, the core or distribution layers can be located in the communication system layer 70.

The core layer can include one or more layers of switching devices 62 that connect the computer resource assets in, for example, layers 40 or 50, to the distribution layer. The distribution layer can include one or more layers of switching devices 62 that connect the core layer to the one or more routers 61. The switches 62 can include one or more network switches, which can include, for example, Ethernet switches. The routers 61 can be arranged to connect to a network (not shown) such as, for example, a local area network (LAN) or the Internet. The routers 61 can include a firewall (not shown).

The SOC 56 (or the SA 44) can include computer resource assets (including hardware, firmware, or software) that provide security analysis and vulnerability detection and identification, malware protection, application visibility and control, reporting, secure mobility, and protection against cyberthreats or cyberattacks that can arise, such as, for example, during connection of a computer resource asset in the OT environment 1 to a computer resource asset operated by, on behalf of or at the instruction of a malicious actor. The SOC 56 can include one or more security analyzers (not shown) that can detect, identify and assess vulnerabilities across many disparate hardware, firmware or software platforms. The security analyzers (not shown) can include, for example, Static Application Security Testing (SAST) tools, Dynamic Application Security Testing (DAST) tools, Software Composition Analysis (SCA) tools, Database Security Scanning (DSS) tools, Mobile Application Security Testing (MAST) tools, Interactive Application Security Testing (IAST) tools, Application Security Testing as a Service (ASTaaS) tools, Correlation tools, Test Coverage Analyzer tools, Application Security Testing Orchestration (ASTO) tools, logging and monitoring tools, log management tools, among many other tools that can analyze computer resource assets and detect, identify and assess vulnerabilities in those computer resource assets, as well as traffic received by or passing through the computing resource.

The SOC 56 can include a Security Information and Event Management (STEM) system (not shown) that can capture and record traffic data received by or passing through computer resource assets in the OT environment 1 for monitoring and threat assessment. The traffic data (or network utilization data) can be received from, for example, server logs and stored in, for example, a vulnerabilities database (not shown), where the traffic data can be stored and/or indexed with, for example, vulnerability scan report data in the vulnerabilities database. To prevent compromises to computer resource assets, the SOC 56 can guide or effectuate remediation to resolve vulnerabilities, including, for example, modifying privileges or access rights, modifying policies or rules, altering or terminating connectivity, alerting personnel, applying patches or fixes, or scheduling training sessions or drills. Remediation can include analyzing and assessing vulnerabilities on computer resource assets, resolving the vulnerabilities or executing mitigating actions on the computer resource assets, including, for example, terminating data transfer, terminating connectivity, modifying privileges (including user access privileges or rights), modifying policies or rules, communicating alarm notifications, dispatching security personnel, locking-down geographic locations, or any other mitigation action that can resolve or mitigate an identified risk or vulnerability to improve a particular Cybersecurity Posture Index CM value or the overall security posture of the OT environment 1.

The firewall (FW) 58 can monitor all data traffic incoming into or outgoing from the OT environment 1 and log source and destination Internet protocol (IP) addresses, port numbers, and protocols. The FW 58 can be included in the SOC 56. The FW 58 can monitor connections and data packets for all protocols used by the OT environment 1, including transmission control protocol (TCP), user datagram protocol (UDP), Internet control message protocol (ICMP), simple mail transfer protocol (SMTP), or any other protocol for data packets transmitted to, from, or within the OT environment 1. The FW 58 can log all connections or data packets that are blocked by the firewall, which can be stored as log data locally in the FW 58 or in the SOC 56. The log data can include event data such as, for example, disabled port openings, dropped data packets, dynamic port openings, firewall policies and rules, repeated unsuccessful access attempts by a communicating device having a particular IP address or group of IP addresses, outgoing connections from communicating devices in the OT environment 1, or any other event or data that might be useful in identifying vulnerabilities or risks in the OT environment 1.

The FW 58 can be configured to, or it can be accessed by the OTC system 100 to transmit the firewall log data to the OTC system 100. The log data can be transmitted as one or more computer files (such as, for example, W3C extend log format (.log) files) or a data feed (such as, for example, a rich site summary (RSS) data feed), which can be transmitted at time intervals that are of sufficient frequency or duration to capture and transmit all firewall log data for the OT environment 1 to the OTC system 100. The log data can include a header section comprising static, descriptive information about the log file or data, as well as available data fields, and a body section that includes compiled data relating to the data traffic that tried to cross the firewall. The log data can be transmitted to the OTC system 100 as a dynamic list, continuously adding and transmitting most recent firewall log events as they occur in real-time.

Figure 2:
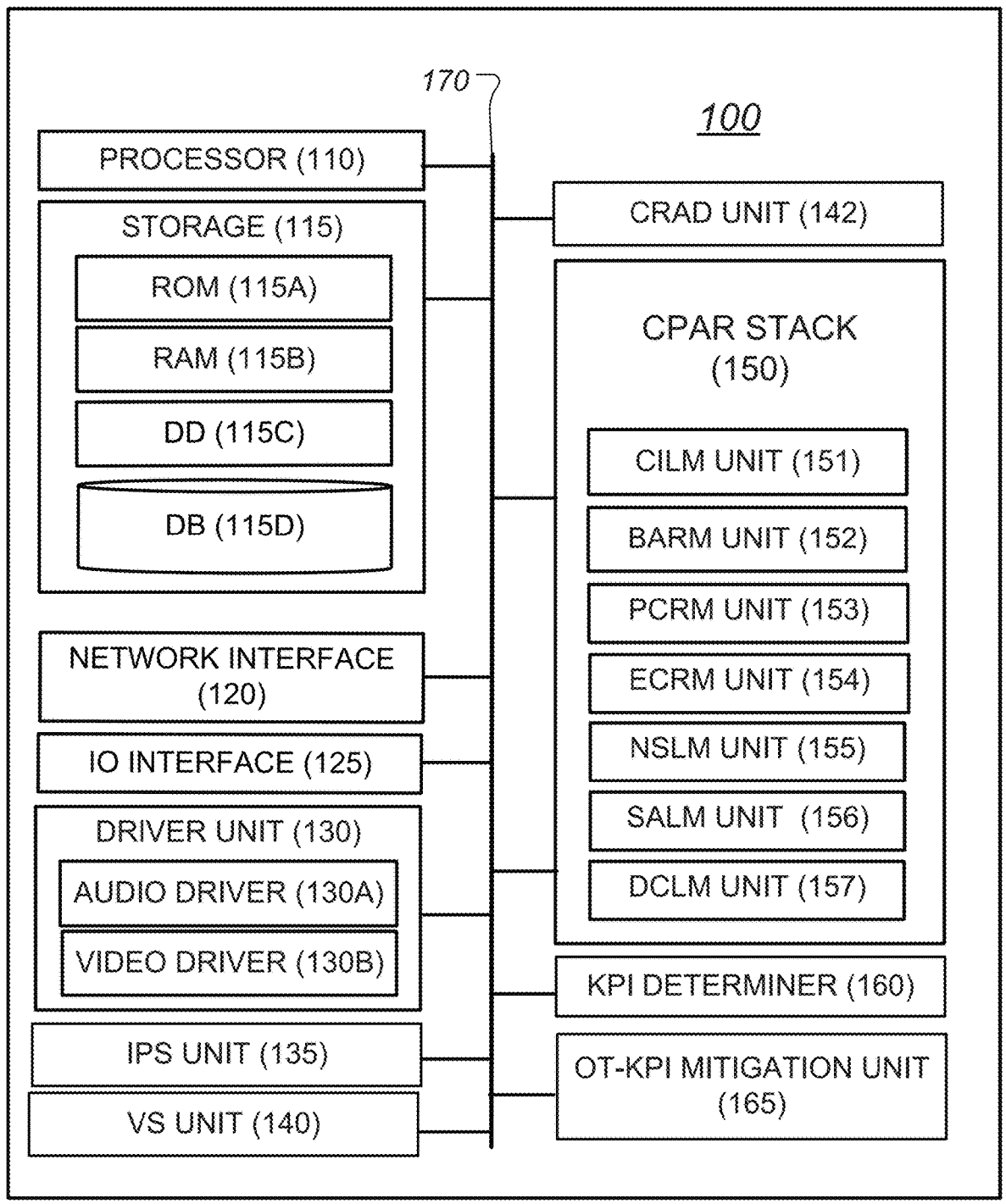
FIG. 2 shows a nonlimiting embodiment of an Operational Technology Cybersecurity (OTC) system that can be included in the cybersecurity solution in FIG. 1.

FIG. 2 shows a nonlimiting embodiment of the Operational Technology Cybersecurity (OTC) system 100, constructed according the principles of disclosure. The OTC system 100 can include a processor 110, a storage 115, a network interface 120, an input-output (10) interface 125, a driver unit 130, an intrusion prevention system unit (IPS) 135, a vulnerability scanner (VS) unit 140, a computer resource asset discovery (CRAD) unit 142, a cybersecurity posture assessment and remediation (CPAR) stack 150, a key performance index (KPI) determiner 160, an operational technology key performance index (OT-KPI) mitigation unit 165 and a bus 170. The bus 170 can be connected by a communication link to each of the computer resource assets 110 to 165. Any one or more of the computer resource assets 115 to 165 can include a computing device or a computing resource that is separate from the processor 110, as seen in FIG. 2, or integrated or integrateable or executable on a computing device such as the processor 110.

The processor 110 can include any of various commercially available computing devices, including for example, a central processing unit (CPU), a graphic processing unit (GPU), a general-purpose GPU (GPGPU), a field programmable gate array (FGPA), an application-specific integrated circuit (ASIC), a manycore processor, multiple microprocessors, or any other computing device architecture can be included in the processor 110.

The OTC system 100 can include a non-transitory computer-readable storage medium that can hold executable or interpretable computer program code or instructions that, when executed by the processor 110 or one or more computer resource assets in the OTC system 100, causes the steps, processes or methods in this disclosure to be carried out. The computer-readable storage medium can be included in the storage 115. The computer readable storage medium can include sections or segments of computer program code or instructions that, when executed by one or more of the computer resource assets in the OTC system 100, such as the processor 110, can cause the system to carry out the processes set forth in or contemplated by this disclosure.

The storage 115, including computer-readable media, can provide nonvolatile storage of data, data structures, and computer-executable instructions. The storage 115 can accommodate the storage of any data in a suitable digital format. The storage 115 can include one or more computing resources such as, for example, program modules or software applications that can be used to execute aspects of the architecture included in this disclosure.

The storage 115 can include a read-only-memory (ROM) 115A, a random-access-memory (RAM) 115B, a disk drive (DD) 115C, and a database (DB) 115D.

A basic input/output system (BIOS) can be stored in the non-volatile memory 115A, which can include a ROM, such as, for example, an erasable programmable read-only memory (EPROM), an electrically erasable programmable read-only memory (EEPROM) or another type of non-volatile memory. The BIOS can contain the basic routines that help to transfer information between the computer resource assets in the OTC system 100, such as during start-up.

The RAM 115B can include a high-speed RAM such as static RAM for caching data. The RAM 115B can include, for example, a static random access memory (SRAM), a dynamic random access memory (DRAM), a synchronous DRAM (SDRAM), a non-volatile RAM (NVRAM) or any other high-speed memory that can be adapted to cache data in the OTC system 100.

The DD 115C can include a hard disk drive (HDD), an enhanced integrated drive electronics (EIDE) drive, a solid-state drive (SSD), a serial advanced technology attachments (SATA) drive, or an optical disk drive (ODD). The DD 115C can be arranged for external use in a suitable chassis (not shown). The DD 115C can be connected to the bus 170 by a hard disk drive interface (not shown) and an optical drive interface (not shown), respectively. The hard disk drive interface (not shown) can include a Universal Serial Bus (USB) (not shown), an IEEE 1394 interface (not shown), and the like, for external applications. The DD 115C can include the computing resources for the CPAR stack 150. The DD 115C can be arranged to store data relating to instantiated processes (including, for example, instantiated process name, instantiated process identification number and instantiated process canonical path), process instantiation verification data (including, for example, process name, identification number and canonical path), timestamps, incident or event notifications.

The database (DB) 115D can be arranged to store computer resource asset (CRA) inventory data for the OT environment 1 (shown in FIG. 1). The DB 115D can include a CRA record for each computer resource asset in the OT environment 1. The CRA record can include for each computer resource asset, for example, configuration data, IP address, MAC address, policies, rules, security analysis data, vulnerability scan results data, Common Vulnerability Scoring System (CVSS) data, traffic log data. The DB 115D can be arranged to be accessed by any of the computer resource assets 110 to 165 in the OTC system 100. The DB 115 D can be arranged to receive queries and, in response, retrieve specific records or portions of records based on the queries. The DB 115D can include a DBMS that can interact with the computer resource assets 110 to 165. The DBMS can be arranged to interact with computer resource assets outside of the OTC system 100, such as, for example, in the SOC 56 (shown in FIG. 1). The DBMS can include, for example, SQL, MySQL, Oracle, Postgress, Access, or Unix. The DB 115D can include a relational database.

The DB 115D can include an active directory of all users in the OT environment 1. The DB 115D can include, for example, a Lightweight Directory Access Protocol (LDAP) directory for all users in the OT environment 1.

One or more computing resources can be stored in the storage 115, including, for example, an operating system (OS), an application program, an API, a program module, or program data. The computing resource can include an API such as, for example, a web API, a SOAP API, an RPC API, a REST API, or any other utility or service API. One or more of the computing resources can be cached in the RAM 115B as executable sections of computer program code or retrievable data.

The network interface 120 can be arranged to connect to a communicating device (not shown) or node (not shown) on an external network such as, for example, the Internet. The network interface 120 can connect to a computer resource asset in the OT environment 1 (shown in FIG. 1), such as, for example, on a local area network (LAN) (not shown). The network interface 120 can include a wired or a wireless communication network interface (not shown) or a modem (not shown). The network interface 120 can be arranged to communicate with computer resource assets in or outside the OT environment 1 via the communication system layer 70 (shown in FIG. 1).

When used in a LAN, the OTC system 100 can be arranged to connect to the LAN through the wired or wireless communication network interface; and, when used in a wide area network (WAN), the OTC system 100 can be arranged to connect to the WAN network through the modem. The modem (not shown) can be internal or external and wired or wireless. The modem can be connected to the bus 170 via, for example, a serial port interface (not shown).

The IO interface 125 can receive commands or data from an operator. The IO interface 125 can be arranged to connect to or communicate with one or more input-output devices (not shown), including, for example, a keyboard (not shown), a mouse (not shown), a pointer (not shown), a microphone (not shown), a speaker (not shown), or a display (not shown). The IO interface 125 can include a human-machine-interface (HMI). The received commands or data can be forwarded from the IO interface 125 as instruction or data signals via the bus 170 to any computer resource asset in the OTC system 100.

The driver unit 130 can include an audio driver 130A and a video driver 130B. The audio driver 130A can include a sound card, a sound driver (not shown), an interactive voice response (IVR) unit, or any other device necessary to render a sound signal on a sound production device (not shown), such as for example, a speaker (not shown). The video driver 130B can include a video card (not shown), a graphics driver (not shown), a video adaptor (not shown), or any other device necessary to render an image signal on a display device (not shown).

The IPS 135 can be included in the OTC system 100, as seen in FIG. 2, or it can be included in the SOC 56 (shown in FIG. 1) and arranged to communicate with the OTC system 100. The IPS unit 135 can be arranged to monitor all communicating devices in the OT environment 1 for events that might indicate malicious activity or that violate a security policy. The IPS unit 135 can detect, log and report any suspect activities or violations in the OT environment 1, including IP addresses of communicating devices involved in the event, port numbers, type of attack, name of attack, time of attack, number of attacks in a given time interval (for example, 1 hour or 24 hours), and any other data that can identify the source, destination, time, and nature of attack. The IPS unit 135 can be configured to prevent data packets from being delivered to a destination computer resource asset based on the contents of the particular data packets. The IPS unit 135 can compare the contents of data packets against a ruleset that can include known threats. The ruleset can be stored locally, for example, in the DB 115D. The IPS unit 135 can analyze data packet header or payload information. Upon detecting suspicious content, the IPS unit 135 can cause the suspect data packet to be rejected and the circumstances surrounding the event to be logged, including the information necessary to identify the IP destination address, source address, rule that was implicated, description of policy violation, and description of suspect activity.

The IPS unit 135 can determine and log whether an attack is malware (for example, virus, worm, Trojan horse, ransomware, or rootkit, bootkits, keyloggers, screen scrapers, logic bombs), access control (for example, breakdown of access control to access network), port scan, peer-to-peer (P2P), instant messaging (IM), denial of service (DoS), buffer overflow, or any other software or hardware attack on any one or more computer resource assets in the OT environment 1.

The vulnerability scanner (VS) unit 140 can be included in the OTC system 100, as seen in FIG. 2, or it can be included in the SOC 56 (shown in FIG. 1) and arranged to communicate with the OTC system 100. The VS unit 140 can be configured to directly access each of the computer resource assets in the OT environment 1, determine computing resource configuration issues, missing security patches, cross-site scripting (XSS) injections, structured query language (SQL) injections, command injections, path traversal vulnerabilities, or any other detectable or known vulnerabilities in the computer resource assets. The VS unit 140 can record each vulnerability in a vulnerability scanning report as vulnerability scanning data. The vulnerability scanning data can include an identification of the applicable computer resource asset, an IP address, a media access control (MAC) address, or any other data that can uniquely identify the applicable computer resource asset. The vulnerability scanning data can include a description of each vulnerability, type of vulnerability, time of scan, or any other information that might identify the vulnerability. The vulnerability scanning data can be stored in the DB 115D for each scanned computer resource asset, for example, in the CRA record corresponding to the scanned computer resource asset.

The CRAD unit 142 can be included in the OTC system 100, as seen in FIG. 2, or it can be included in the SOC 56 (shown in FIG. 1), in which case the CRAD unit 142 can be arranged to communicate with the OTC system 100. The CRAD unit 142 can be arranged to scan the computer resource assets in the OT environment 1 periodically (or continuously), checking each computer resource asset to maintain a comprehensive, complete and accurate inventory of all computer resource assets in the OT environment 1. This approach can provide a snapshot inventory of all computer resource assets in the OT environment 1, including computer resource assets at each of layers 10 to 70 (shown in FIG. 1). For each computer resource asset in the OT environment 1, the CRAD unit 142 can record CRA inventory data, including, for example, IP address, type of computer resource asset, time of scan, state of the computer resource asset, whether it is critical to the OT infrastructure or enterprise, or any other information that can identify the computer resource asset, its location in the OT environment 1, its type or operating state, or its importance to the OT environment 1 or enterprise. The recorded CRA inventory data can include, for each computer resource asset in the OT environment 1, configuration data, policies, rules, hardware, software, contracts, purchase orders, licenses, warranties, or security features, such as, for example, malware protection, antivirus, status of software patches, types of vulnerabilities scans performed, vulnerability scan date, vulnerability scan results, and history of security remediation performed.

The CPAR stack 150 can be arranged to interact with each computer resource asset on the OT environment 1 (shown in FIG. 1). The CPAR stack 150 can be arranged to interact with an operator, for example, via the IO interface 125. The CPAR stack 150 can be arranged to interact with the DB 115D and query CRA inventory data or active directory data. The CPAR stack 150 can be arranged to manage and implement an inventory of all computer resource assets, nodes and users in the OT environment 1. The CPAR stack 150 can be arranged to provide a profile for each computer resource asset, node or user in the OT environment 1, and to periodically update CRA inventory data or active directory data for the OT environment 1. The CRA inventory data can include historical CRA inventory data for all computer resource assets on the OT environment 1.

The CPAR stack 150 can include, for example, a cybersecurity incidence level metrics (CILM) unit 151, a backup availability ratio metrics (BARM) unit 152, a patch compliance ratio metrics (PCRM) unit 153, an endpoint compliance ratio metrics (ECRM) unit 154, a network security level metrics (NSLM) unit 155, a security awareness level metrics (SALM) unit 156, and a drill compliance level metrics (DCLM) unit 157. The computer resource assets 151 to 157 can be arranged to communicate with the IPS unit 135, VS unit 140, CRAD unit 142, SOC 56 (shown in FIG. 1), or computer resource assets in the environment 1 (shown in FIG. 1).

The CPAR stack 150 can be arranged to be expandable so as to include fewer or more units—that is, less than or in addition to the computer resource assets 151 to 157. The computer resource assets 151 to 157 can be included in the CPAR stack 150, as seen in FIG. 2, or they can be located elsewhere in the OT environment 1 (shown in FIG. 1), such as, for example, in the SOC 56. The CPAR stack 150 can be arranged to communicate with the computer resource assets in the OT environment 1 and measure, monitor, evaluate or assess each Cybersecurity Posture Index $CPI_i$ for the OT environment 1 (shown in FIG. 1), including determining a Cybersecurity Indicator Metric $CIM_j$ value for each $CPI_i$. The CPAR stack 150 can determine an NRT snapshot for each $CPI_i$, as well as communicate with the KPI determiner 160 to determine an overall cybersecurity posture value for the OT environment 1. Although the following description of the CPAR stack 150 is based on the nonlimiting embodiment where i=j, it is noted that the disclosure also includes embodiments wherein j>i.

The CILM unit 151 can be arranged to calculate or attain (for example, from the IPS unit 135 or SOC 56) a total number of cybersecurity incidents on the OT environment 1 ($I_{Total}$) over the period of time ($T_{Period}$), which can include, for example, a one-hour period, a 24-hour period, a multi-day period, or any other duration of time, as will be understood by those skilled in the art. The CILM unit 151 can include a predetermined baseline ($I_{Baseline}$) value for the same period $T_{Period}$. Based on the total number of incidents $I_{Total}$ and base line $I_{Baseline}$, the CILM unit 151 can determine the Cybersecurity Posture Index $CPI_1$ in near-real-time for the cybersecurity incidence level for the entire OT environment according to Eq. 1, namely: $CPI_1 = I_{Total}/I_{Baseline} - 1$.

The BARM unit 152 can be arranged to calculate or attain, for example, from the CRAD unit 142, the total number of computer resource assets deemed critical $CCRA_{Total}$, as well as the total number of computer resource assets in the OT environment 1 deemed critical for which a backup computer resource asset is available $BCCRA_{Total}$ during $T_{Period}$. The BARM unit 152 can determine the $CPI_2$ in near-real-time for the backup availability ratio for the entire OT environment according to Eq. 2, namely: $CPI_2 = BCCRA_{Total}/CCRA_{Total} \times 100$. 2).

The PCRM unit 153 can be arranged to calculate or attain, for example, from the VS unit 140 or CRAD unit 142, the total number of computer resource assets online $ACRA_{Total}$ during $T_{Period}$, as well as the total number of computer resource assets in the OT environment 1 that are determined to be compliant with all applicable patch policies $PCRA_{Total}$ during the same period of time. The PCRM unit 153 can determine the $CPI_3$ in near-real-time for the patch compliance ratio for the computer resource assets on the OT environment according to Eq. 3, namely: $CPI_3 = PCRA_{Total}/CRA_{Total} \times 100$.

The ECRM unit 154 can be arranged to calculate or attain, for example, from the VS unit 140 or CRAD unit 142, the total number of computer resource assets online $ACRA_{Total}$ during $T_{Period}$, as well as the total number of endpoint computer resource assets in the OT environment $ECRA_{Total}$ that are determined to be compliant with the applicable endpoint protection policy during the same period. The ECRM unit 154 can determine the $CPI_4$ in near-real-time for the endpoint compliance ratio for the computer resource assets on the OT environment according to Eqs. 4 and 5, namely: $ECRA_{Total}=\Sigma ECRA_1+ECRA_2+\ldots+ECRA_k$ (Eq. 4) and $CPI_4=(ECRA_{Total}/ACRA_{Total})k\times100$ (Eq. 5).

The NSLM unit 155 can be arranged to calculate or attain, for example, from the CRAD unit 142, the total number of computer resource assets that are connected to a network $NCRA_{Total}$, the total number of those assets that have a hardened device configuration $DCH-CRA_{Total}$ and the total number of those assets that have a hardened firewall policy $FCH-CRA_{Total}$. The NSLM unit 155 can determine the $CPI_5$ in near-real-time for the network security level for the computer resource assets on the OT environment according to Eqs. 6-8, namely: $R_{DCH}=DCH-CRA_{Total}/NCRA_{Total}$ (Eq. 6); $R_{FCH}=FCH-CRA_{Total}/NCRA_{Total}$ (Eq. 7); and $CPI_5=\Sigma R_{DCH}\times C_1+R_{FCH}\times C_2$ (Eq. 8).

The SALM unit 156 and DCLM unit 157 can be arranged to calculate or attain, for example, from the SOC 56 (shown in FIG. 1), the total number of actual security awareness sessions $T_{SAct}$ that have been conducted during a period of time, the total number of sessions recommended $T_{SRec}$ during the time period, the total number of disaster or cybersecurity drills $T_{Drill}$ that have been conducted during the period of time, and the total number of expected drills sessions $T_{SetDrills}$ during the time period. The SALM unit 156 can determine the $CPI_6$ in near-real-time for the security awareness level for users of the computer resource assets in the OT environment according to Eq. 9, namely: $CPI_6=T_{SAct}/T_{SRec}\times100$ (Eq. 9). The DCLM unit 157 can determine the $CPI_7$ in near-real-time for the drill compliance level for the OT environment according to Eq. 10, namely: $CPI_7=T_{Drill}/T_{SetDrills}\times100$ (Eq. 10).

The KPI determiner 160 can be arranged to receive the near-real-time $CPI_i$ value from the computer resource assets in the CPAR stack 150, adjust each $CPI_i$ value by its respective weight $W_i$ and aggregating the weighted CPIs to determine the overall cybersecurity posture level $KPI_{OT}$ for the OT environment, according to Eq. 11, namely: $KPI_{OT}=\Sigma W_i \cdot CPI_i$. The KPI determiner 160 can be arranged to compare the $KPI_{OT}$ value to a threshold (or setpoint) cybersecurity posture level $KPI_{TH}$ for the OT environment 1. The threshold $KPI_{TH}$ can be set to any level for the cybersecurity posture of the overall OT environment deemed acceptable, such as, for example, $KPI_{TH}=98\%$. It is noted that $KPI_{TH}$ can be set to any numerical value, including values less than or greater than 98%, as will be understood by those skilled in the art after reading the disclosure.

If the KPI determiner 160 determines the $KPI_{OT}$ is less than the $KPI_{TH}$ for the OT environment 1, a notification message can be generated and sent to, for example, a computer resource asset in the SOC 56 (shown in FIG. 1), such as, for example, a workstation (not shown) that is operated by cybersecurity personnel. The notification message can be generated, including image rending data and commands, by the KPI determiner 160, or by the OT-KPI mitigation unit 165, in which case the notification message can be generated in response to a trigger from the KIP determiner 160. The notification message can include image renddering data and commands that, when executed on a computing device in the computer resource asset cause the asset to render an image of an NRT snapshot on a display device (not shown). The KPI determiner 160 can generate and send data and commands to the computer resource asset to render an NRT snapshot on a display device (not shown) for the overall cybersecurity posture level $KPI_{OT}$, as well as an NRT snapshot for each $CPI_i$.

The KPI determiner 160 can be arranged to compare each $CPI_i$ value to a corresponding threshold (or setpoint) $CPI_{i-TH}$ value. If a particular index $CPI_i$ is determined to have an overall value below its corresponding threshold $CPI_{i-TH}$, the KPI determiner 160 can be arranged to trigger remediation by the OT-KPI mitigation unit 165 for the underlying metrics, including associated computer resource assets, to cause that index to increase to a value that is above its threshold value $CPI_{i-TH}$.

The threshold $CPI_{i-TH}$ can be arranged to evolve overtime and adjust as a learning curve for the OT organization develops. The initial value for the threshold $CPI_{i-TH}$ can be set arbitrarily or as desired, as will be understood by those skilled in the art, and the value can then be adjusted over time by, for example, the OT-KPI mitigation unit 165 in response to feedback from users. Organization cybersecurity capabilities can be taken into consideration when the threshold value is adjusted.

Figure 3A:
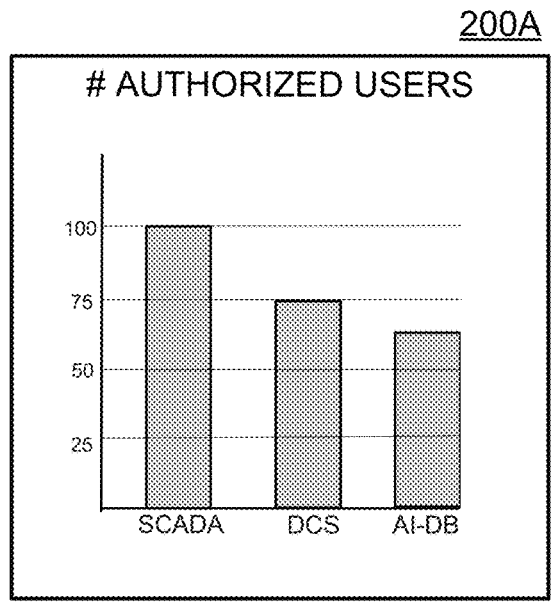
FIGS. 3A-3H show nonlimiting examples of near-real-time (NRT) snapshots that can be rendered by a display device in the OT environment in FIG. 1.
Figure 3B:
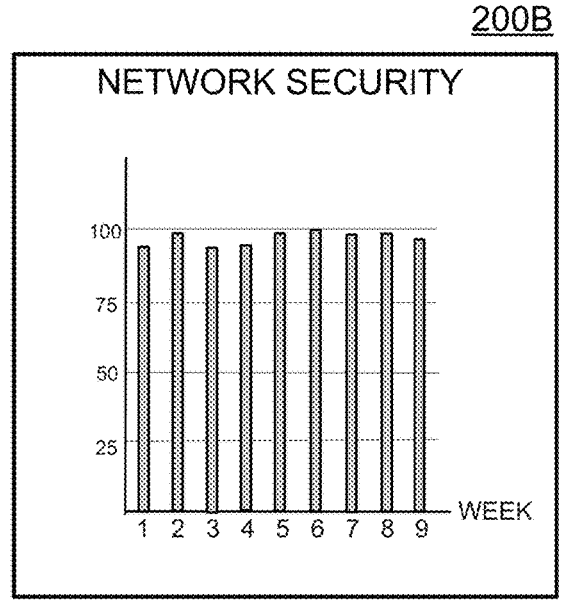
Figure 3C:
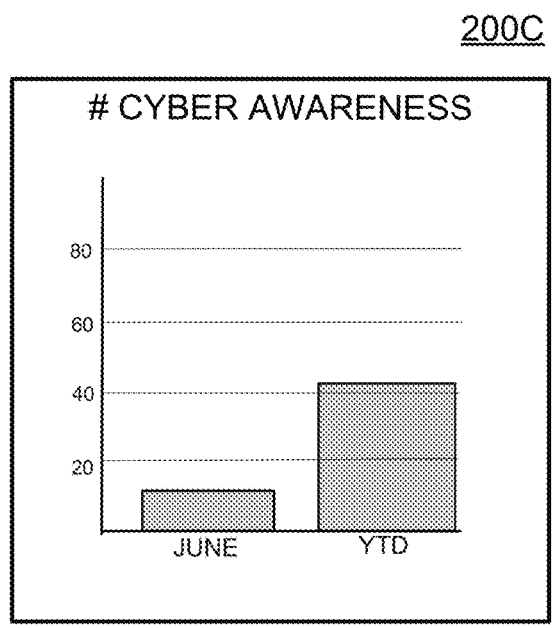
Figure 3D:
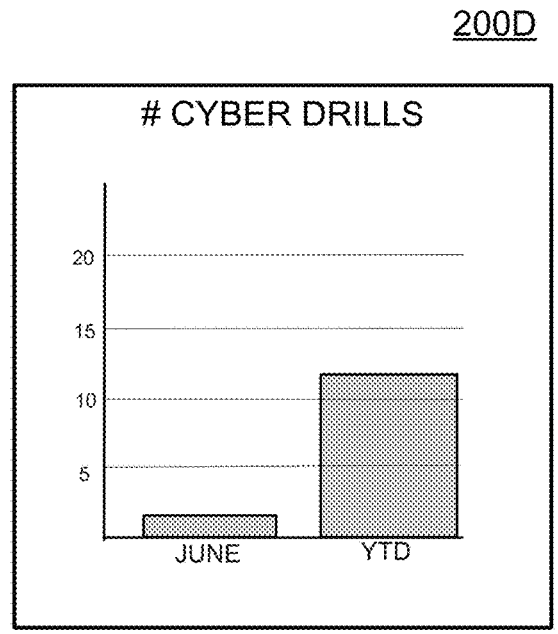
Figure 3E:
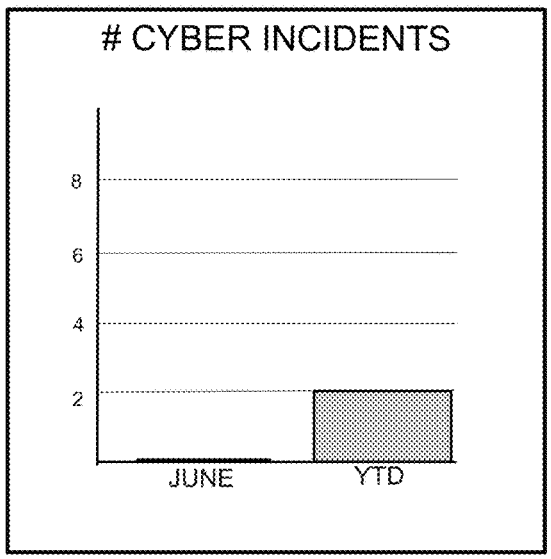
Figure 3F:
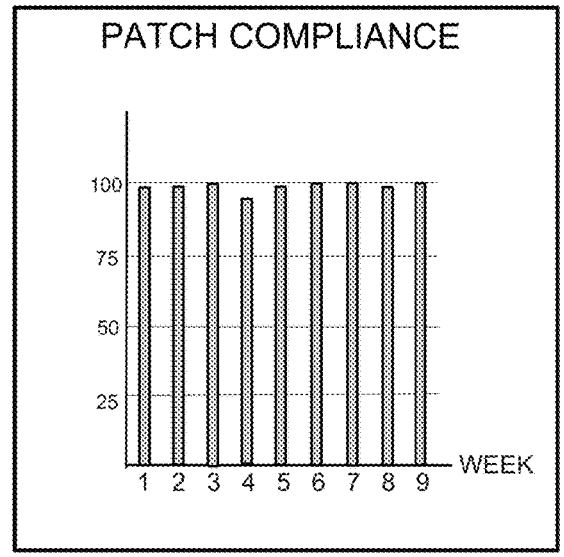
Figure 3G:
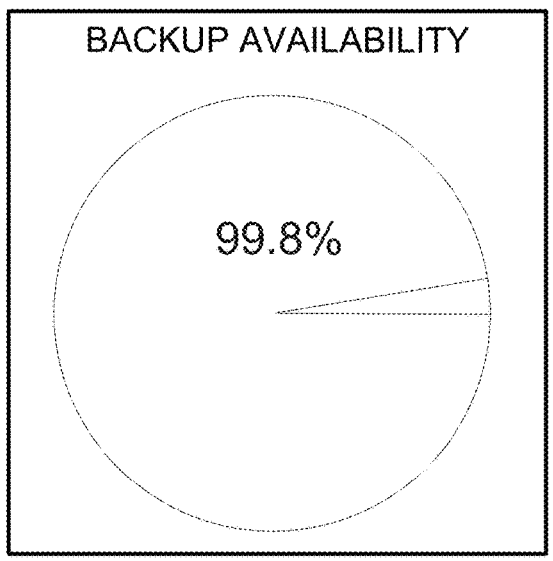
Figure 3H:
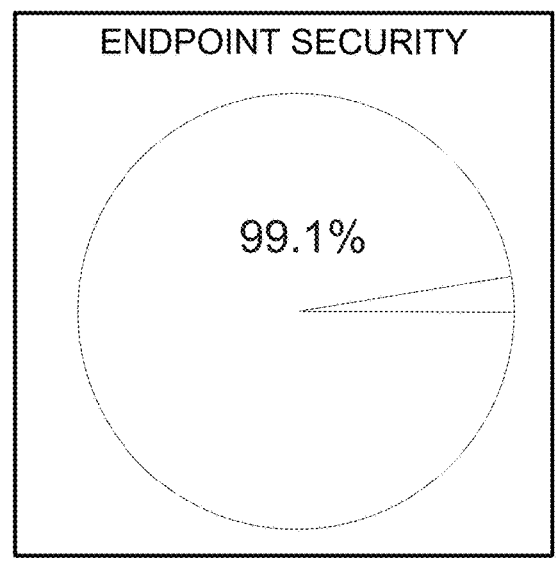

FIGS. 3A-3H illustrate nonlimiting examples of NRT snapshots 200A-200H, respectively, that can be rendered by the display device (not shown) in response to the data and commands generated by the KPI determiner 160. FIG. 3A shows an NRT snapshot 200A for the number users authorized to access the SCADA, DCS or datasets in an artificial intelligence databases (AI-DB) on the OT environment 1; FIG. 3B shows an NRT snapshot 200B for the network security level metrics index determined by the NSLM unit 155 for nine consecutive weeks; FIG. 3C shows an RNT snapshot 200C for the security awareness level metrics index determined by the SALM unit 156 for the actual month of June and the year-to-date total (YTD); FIG. 3D shows an NRT snapshot 200D for the drill compliance level metrics index determined by the DCLM unit 157 for the actual month of June and YTD; FIG. 3E shows an NRT snapshot 200E for the cybersecurity incidence level metrics index determined by the CILM unit 151 for the actual month of June and YTD; FIG. 3F shows an NRT snapshot 200F for the patch compliance ration metric index determined by the PCRM unit 153 for a consecutive nine week period; FIG. 3G shows an NRT snapshot 200G for the backup availability ratio metrics index determined by the BARM unit 152, which indicates 99.8% backup level in this example; and, FIG. 3H shows an NRT snapshot 200H for the endpoint compliance ratio metrics index determined by the ECRM unit 154, which indicates 99.1% compliance level in this example.

The OT-KPI mitigation unit 165 can be arranged to receive each of the NRT $CPI_i$ values and underlying metrics data from the CPAR stack 150, including all metrics that were analyzed in generating, for example, the NRT snapshots 200A to 200H, shown in FIGS. 3A to 3H, respectively. The OT-KPI mitigation unit 165 can receive the overall cybersecurity posture level $KPI_{OT}$ for the OT environment 1 from the KPI determiner 160 and, based on the underlying metrics used to determine the $CPI_i$ values, the OT-KPI mitigation unit 165 can target one or more of the underlying metrics for remediation or mitigation so as to cause the overall cybersecurity posture level $KPI_{OT}$ to increase above the threshold value $KPI_{TH}$ set for the OT environment 1.

The OT-KPI mitigation unit 165 can be arranged to effectuate remediation, or guide remediation by a computer resource asset (not shown) in the SOC 56 (shown in FIG. 1), by, for example, resolving vulnerabilities, modifying privileges or access rights, modifying policies or rules, altering or terminating connectivity, alerting personnel, applying patches or fixes, scheduling training sessions or drills or executing an action on a computer resource asset on the OT environment 1 to cause a particular CM to increase to a level above its respective threshold $CPI_{i-TH}$, or the overall cybersecurity posture level $KPI_{OT}$ for the OT environment to increase above the threshold $KPI_{TH}$. Remediation can include analyzing and assessing vulnerabilities on computer resource assets, resolving the vulnerabilities or executing mitigating actions on the computer resource assets, including, for example, terminating data transfer, terminating connectivity, modifying privileges (including user access privileges or rights), modifying policies or rules, communicating alarm notifications, dispatching security personnel, locking-down geographic locations, or any other mitigation action that can resolve or mitigate an identified risk or vulnerability to improve a particular Cybersecurity Posture Index CM value or the overall security posture level $KPI_{OT}$ of the OT environment 1.

A non-limiting objective of the solution is to automate collection and analysis of received metrics data, ensure an acceptable range of data feed and provide timely and effective reporting, thereby providing users with a real-time cybersecurity posture snapshot.

Figure 4:
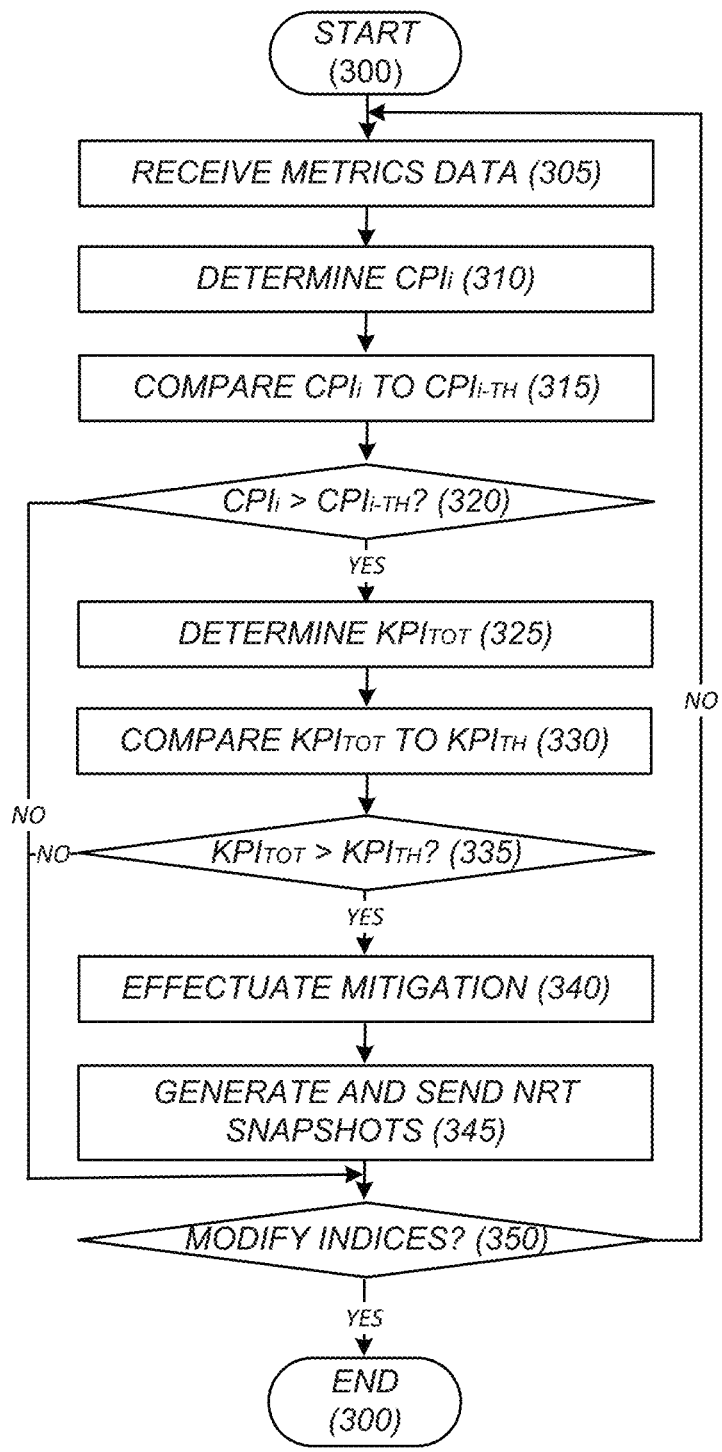
FIG. 4 shows a nonlimiting embodiment of a cybersecurity assessment and remediation process, according to the principles of the disclosure.

FIG. 4 shows a nonlimiting embodiment of a cybersecurity assessment and remediation process 300, according to the principles of the disclosure. Initially, the CPAR stack 150 (shown in FIG. 2) can receive metrics data for each of the established Cybersecurity Posture Indices $CPI_i$ (Step 305). The metrics data can be received from, for example, the IPS unit 135, VS unit 140, CRAD unit 142 or a computer resource asset in the SOC 56 (shown in FIG. 1). The received metrics data can be processed by each of the computer resource assets in the CPAR stack 150 to determine a Cybersecurity Indicator Metric CM value, which in this nonlimiting embodiment, where i=j, is equal to the $CPI_i$ value. The received metrics data can be processed simultaneously or in parallel by each of the computer resource assets in the CPAR stack 150, or at a different time such as, for example, sequentially.

In the nonlimiting embodiment discussed above with reference to FIG. 2, in Step 310: the CILM unit 151 can determine the Cybersecurity Posture Index $CPI_i$ in near-real-time for the cybersecurity incidence level for the entire OT environment; the BARM unit 152 can determine the $CPI_2$ for the backup availability ratio; the PCRM unit 153 can determine the $CPI_3$ for the patch compliance ratio; the ECRM unit 154 can determine the $CPI_4$ for the endpoint compliance ratio; the NSLM unit 155 can determine the $CPI_5$ for the network security level; the SALM unit 156 can determine the $CPI_6$ for the security awareness level; and, the DCLM unit 157 can determine the $CPI_7$ for the drill compliance level for the OT environment. Each determined near-real-time $CPI_i$ value can be compared to its respective threshold $CPI_{i-TH}$ value (Step 315), and if the $CPI_i$ value is determined to be greater than its respective threshold $CPI_{i-TH}$ value (YES at Step 320), then the overall Cybersecurity Posture level $KPI_{TOT}$ can be determined by the KPI determiner 160 (shown in FIG. 2) for the OT environment 1 (Step 325). The resultant $KPI_{TOT}$ value can be compared to the threshold $KPI_{TH}$ value (Step 330), and if the $KPI_{TOT}$ value is determined to be greater than the threshold $KPI_{TH}$ value (YES at Step 335), then mitigation can be effectuated (Step 340).

As discussed above, the mitigation (Step 340) can be effectuated by the OT-KPI mitigation unit 165 (shown in FIG. 2). The mitigation can be effectuated based on the underlying metrics data for the $CPI_i$ value or the overall $KPI_{TOT}$ value, as discussed above.

A notification message can be generated and sent (Step 345), for example, by the KPI determiner 160 to a computer resource asset (not shown) in the SOC 56 (shown in FIG. 1). The notification message can include a near-real-time (NRT) snapshot for each $CPI_i$ value, the underlying metrics data, and image rendering data and commands to render the NRT snapshot 200 (for example, 200A to 200H shown in FIGS. 3A-3H, respectively) on the computer resource asset (not shown) in the SOC 56.

A determination can be made whether the established $CPI_i$ indices should be modified for the OT environment (Step 350). The determination can be made when the $CPI_i$ value is determined to be equal to or less than its respective threshold $CPI_{i-TH}$ value (NO at Step 320), or when the $KPI_{TOT}$ value is determined to be equal to or less than the threshold $KPI_{TH}$ value (NO at Step 335). If it is determined that a modification should be made (YES at Step 350), then the process 300 can be ended and modification enabled on the OTC system 100, for example, via the IO interface 125 (shown in FIG. 2). The OTC system 100 can enable one or more Cybersecurity Posture Indices to be added, removed or modified, or modifications can be made to one or more parameters, such as, for example the parameters used in Eqs. 1-11, including, for example, the constants C1 or $C_2$, or one or more weights $W_i$.

If, however, a determination is made that no modification should be made (NO at Step 350), then the process 300 can repeat.

In establishing a Cybersecurity Posture Index (CPI) for an OT environment, the following criteria can be considered, among others:

Reason for Measurement: The CPI can translate and transform complex technical metrics into user-friendly terms that are clear, precise and relevant to the user. Such metrics can be used to establish good communication across all users and keep them involved at all times, as well as provide the required data to target computer resource assets for risk mitigation or to effectuate risk mitigation such as resolving or remediating vulnerabilities, as needed.

Focus of Measurement: The CPI can focus on issues relevant to an ICS in the OT environment. For example, the CPI can focus on implemented technologies and people domains as targeted domains to build. Governance domain need not be a part of the CPI since such a domain can require different techniques to align with international standards such as NIST, NIRC, ISA, or IEC standards.

Measurement Capabilities: measurements can be directed to the ICS, for example, starting with a simple formula and measurement, and capitalizing on support staff experience to focus on quick wins. Previous assessments of gaps can be referenced and used as a starting point.

Learning to Measure: The CPI can be aligned with business or technical objectives and goals (for example, an OT environment in a gas plant can have as its primary objective supplying a gas product to end users). The solution can start small and build CPIs as the solution evolves. The developed CPIs can be made scalable and simple to understand, especially by non-technical users.

As will be understood by those skilled in the art after reading this disclosure, the OTC system 100 can be applied in real-time and without delay, thereby providing a cybersecurity confidence level that enterprises desperately need with regard to their OT environments.

The terms "a," "an," and "the," as used in this disclosure, means "one or more," unless expressly specified otherwise.

The term "backbone," as used in this disclosure, means a transmission medium or infrastructure that interconnects one or more computing devices or communication devices to provide a path that conveys data packets and instruction signals between the one or more computing devices or communication devices. The backbone can include a network. The backbone can include an Ethernet TCP/IP. The backbone can include a distributed backbone, a collapsed backbone, a parallel backbone or a serial backbone.

The term "bus," as used in this disclosure, means any of several types of bus structures that can further interconnect to a memory bus (with or without a memory controller), a peripheral bus, or a local bus using any of a variety of commercially available bus architectures. The term "bus" can include a backbone.

The term "communicating device," as used in this disclosure, means any computing device, hardware, or computing resource that can transmit or receive data packets, instruction signals or data signals over a communication link. The communicating device can be portable or stationary.

The term "communication link," as used in this disclosure, means a wired or wireless medium that conveys data or information between at least two points. The wired or wireless medium can include, for example, a metallic conductor link, a radio frequency (RF) communication link, an Infrared (IR) communication link, or an optical communication link. The RF communication link can include, for example, WiFi, WiMAX, IEEE 802.11, DECT, 0G, 1G, 2G, 3G, 4G or 5G cellular standards, or Bluetooth. A communication link can include, for example, an RS-232, RS-422, RS-485, or any other suitable interface.

The terms "computer," "computing device," or "processor," as used in this disclosure, means any machine, device, circuit, component, or module, or any system of machines, devices, circuits, components, or modules that are capable of manipulating data according to one or more instructions. The terms "computer," "computing device" or "processor" can include, for example, without limitation, a processor, a microprocessor (µC), a central processing unit (CPU), a graphic processing unit (GPU), an application specific integrated circuit (ASIC), a compute core, a compute machine, a general purpose computer, a super computer, a personal computer, a laptop computer, a palmtop computer, a notebook computer, a desktop computer, a workstation computer, a server, a server farm, a computer cloud, or an array or system of processors, µCs, CPUs, GPUs, ASICs, general purpose computers, super computers, personal computers, laptop computers, palmtop computers, notebook computers, desktop computers, workstation computers, or servers.

The terms "computer resource asset" or "computing resource asset," as used in this disclosure, means a computing resource, a computing device or a communicating device, or any combination thereof.

The term "computer-readable medium" or "computer-readable storage medium," as used in this disclosure, means any non-transitory storage medium that participates in providing data (for example, instructions) that can be read by a computer. Such a medium can take many forms, including non-volatile media and volatile media. Non-volatile media can include, for example, optical or magnetic disks and other persistent memory. Volatile media can include dynamic random-access memory (DRAM). Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, a carrier wave as described hereinafter, or any other medium from which a computer can read. The computer-readable medium can include a "cloud," which can include a distribution of files across multiple (e.g., thousands of) memory caches on multiple (e.g., thousands of) computers.

Various forms of computer readable media can be involved in carrying sequences of instructions to a computer. For example, sequences of instruction (i) can be delivered from a RAM to a processor, (ii) can be carried over a wireless transmission medium, or (iii) can be formatted according to numerous formats, standards or protocols, including, for example, WiFi, WiMAX, IEEE 802.11, DECT, 0G, 1G, 2G, 3G, 4G, or 5G cellular standards, or Bluetooth.

The term "computing resource," as used in this disclosure, means software, a software application, a web application, a web page, a computer application, a computer program, computer code, machine executable instructions, firmware, or a process that can be arranged to execute on a computing device or a communicating device.

The terms "connectivity" or "connectivity link," as used in this disclosure, means a communication link or any combination of communication links that connects two or more nodes, carrying data packets between the nodes. A data packet can include an Internet Protocol (IP) data packet. A data packet can include an instruction signal that, when received by a communicating device can cause the device to carry out a predetermined function or task. The data packet can include a data packet signal that, when received by a communicating device can be implemented in carrying out a predetermined function or task, or processed to render information.

The term "database," as used in this disclosure, means any combination of software or hardware, including at least one computing resource or at least one computer. The database can include a structured collection of records or data organized according to a database model, such as, for example, but not limited to at least one of a relational model, a hierarchical model, or a network model. The database can include a database management system application (DBMS). The at least one application may include, but is not limited to, a computing resource such as, for example, an application program that can accept connections to service requests from communicating devices by sending back responses to the devices. The database can be configured to run the at least one computing resource, often under heavy workloads, unattended, for extended periods of time with minimal or no human direction.

The terms "device" or "equipment," as used in this disclosure, means any structure, thing or article that can be arranged, adapted, configured or made for a particular purpose or to perform a particular task, function or operation.

The terms "including," "comprising" and variations thereof, as used in this disclosure, mean "including, but not limited to," unless expressly specified otherwise.

The term "node," as used in this disclosure, means a physical or virtual location in a network that comprises or can comprise a computer resource asset.

The term "server," as used in this disclosure, means any combination of software or hardware, including at least one computing resource or at least one computer to perform services for connected communicating devices as part of a client-server architecture. The at least one server application can include, but is not limited to, a computing resource such as, for example, an application program that can accept connections to service requests from communicating devices by sending back responses to the devices. The server can be configured to run the at least one computing resource, often under heavy workloads, unattended, for extended periods of time with minimal or no human direction. The server can include a plurality of computers configured, with the at least one computing resource being divided among the computers depending upon the workload. For example, under light loading, the at least one computing resource can run on a single computer. However, under heavy loading, multiple computers can be required to run the at least one computing resource. The server, or any if its computers, can also be used as a workstation.

Devices that are in communication with each other need not be in continuous communication with each other, unless expressly specified otherwise. In addition, devices that are in communication with each other may communicate directly or indirectly through one or more intermediaries.

Although process steps, method steps, algorithms, or the like, may be described in a sequential or a parallel order, such processes, methods and algorithms may be configured to work in alternate orders. In other words, any sequence or order of steps that may be described in a sequential order does not necessarily indicate a requirement that the steps be performed in that order; some steps may be performed simultaneously. Similarly, if a sequence or order of steps is described in a parallel (or simultaneous) order, such steps can be performed in a sequential order. The steps of the processes, methods or algorithms described herein may be performed in any order practical.

When a single device or article is described herein, it will be readily apparent that more than one device or article may be used in place of a single device or article. Similarly, where more than one device or article is described herein, it will be readily apparent that a single device or article may be used in place of the more than one device or article. The functionality or the features of a device may be alternatively embodied by one or more other devices which are not explicitly described as having such functionality or features.

The subject matter described above is provided by way of illustration only and should not be construed as limiting. Various modifications and changes can be made to the subject matter described herein without following the example embodiments and applications illustrated and described, and without departing from the true spirit and scope of the invention encompassed by the present disclosure, which is defined by the set of recitations in the following claims and by structures and functions or steps which are equivalent to these recitations.

What is claimed is:

1. A method for monitoring and assessing an overall cybersecurity posture level of an operation technology environment to increase said level when the level is determined to be below a setpoint value for the operation technology environment, the method comprising:
   receiving metrics data for a corresponding one of each of a plurality of cybersecurity posture indices ($CPI_i$) for the operation technology environment;
   determining a cybersecurity posture index ($CPI_i$) value for each of the plurality of cybersecurity posture indices ($CPI_i$) based on the metrics data, wherein the $CPI_i$ value is an aggregate of Cybersecurity Indicator Metric values;
   comparing each $CPI_i$ value to a respective threshold $CPI_{i\text{-}TH}$;
   in case a given $CPI_i$ value is less than or equal to the respective threshold $CPI_{i\text{-}TH}$, determining whether to modify the given $CPI_i$ value;
   in case the given $CPI_i$ value is greater than the respective threshold $CPI_{i\text{-}TH}$, determining a key performance index ($KPIi_{TH}$) value for each of a plurality of key performance indices (KPIi), wherein the $KPI_i$ is a weighted aggregate of Cybersecurity Indicator Metric values;
   determining a key performance index total ($KPI_{TOT}$) value;
   comparing the $KPI_{TOT}$ value to each $KPI_{iTH}$ value;
   in case the $KPI_{TOT}$ value is greater than a given $KPI_{iTH}$ value, determining whether to modify the given $CPI_{iTH}$ value;
   in case the $KPI_{TOT}$ value is not greater than a given $KPI_{iTH}$ value, generating a notification message, including image rendering data and commands;
   sending the notification message to a computer resource asset to render an image of a snapshot cybersecurity posture level for at least one of the plurality of cybersecurity posture indices (CHIi); and
   determining whether to modify the given $CPI_{iTH}$ value.

2. The method in claim 1, further comprising:
   effectuating remediation based on the overall cybersecurity posture level of the operation technology environment.

3. The method in claim 1, further comprising:
   effectuating remediation based on the snapshot cybersecurity posture level.

4. The method in claim 1, wherein the snapshot cybersecurity posture level includes a near-real-time (NRT) snapshot cybersecurity posture level.

5. The method in claim 1, wherein the overall cybersecurity posture level of the operation technology environment includes a near-real-time (NRT) snapshot overall cybersecurity posture level.

6. The method in claim 1, wherein said snapshot cybersecurity posture level comprises a near-real-time (NRT) snapshot cybersecurity posture level for at least one of:
   a number of users authorized access to the operation technology environment;
   a network security level for the operation technology environment;
   a number of cyber awareness sessions performed on the operation technology environment;
   a number of cyber drills performed on the operation technology environment;
   a number of cybersecurity incidents in the operation technology environment;
   a patch compliance ratio for computer resource assets in the operation technology environment;
   a backup availability ratio for computer resource assets in the operation technology environment; and
   an endpoint security compliance ratio for computer resource assets in the operation technology environment.

7. The method in claim 3, wherein effectuating remediation comprises fixing a vulnerability on a computer resource asset in the operation technology environment.

8. The method in claim 3, wherein effectuating remediation comprises guiding, on said computer resource asset, mitigation of a vulnerability on a different computer resource asset in the operation technology environment.

9. A non-transitory computer readable storage medium having stored thereon instructions for monitoring and assessing an overall cybersecurity posture level of an operation technology environment that, when executed by a computing device, cause the computing device to perform operations comprising:

receiving metrics data for a corresponding one of each of a plurality of cybersecurity posture indices ($CPI_i$) for the operation technology environment;

determining a cybersecurity posture index ($CPI_i$) value for each of the plurality of cybersecurity posture indices ($CPI_i$) based on the metrics data, wherein the $CPI_i$ value is an aggregate of Cybersecurity Indicator Metric values;

comparing each $CPI_i$ value to a respective threshold $CPI_{i\text{-}TH}$;

in case a given $CPI_i$ value is less than or equal to the respective threshold $CPI_{i\text{-}TH}$, determining whether to modify the given $CPI_i$ value;

in case the given $CPI_i$ value is greater than the respective threshold $CPI_{i\text{-}TH}$, determining a key performance index ($KPIi_{TH}$) value for each of a plurality of key performance indices (KPIi), wherein the $KPI_i$ is a weighted aggregate of Cybersecurity Indicator Metric values;

determining a key performance index total ($KPI_{TOT}$) value;

comparing the $KPI_{TOT}$ value to each $KPI_{iTH}$ value;

in case the $KPI_{TOT}$ value is greater than a given $KPI_{iTH}$ value, determining whether to modify the given $CPI_{iTH}$ value;

in case the $KPI_{TOT}$ value is not greater than a given $KPI_{iTH}$ value, generating a notification message, including image rendering data and commands; and sending the notification message to a computer resource asset to render an image of a snapshot cybersecurity posture level for at least one of the plurality of cybersecurity posture indices (CHIi); and determining whether to modify the given $CPI_{iTH}$ value.

10. The non-transitory computer readable storage medium in claim 9, wherein the instructions, when executed by the computing device, cause the computing device to perform a further operation comprising:

effectuating remediation based on the overall cybersecurity posture level of the operation technology environment.

11. The non-transitory computer readable storage medium in claim 9, wherein the instructions, when executed by the computing device, cause the computing device to perform a further operation comprising:

effectuating remediation based on the snapshot cybersecurity posture level.

12. The non-transitory computer readable storage medium in claim 9, wherein the snapshot cybersecurity posture level includes a near-real-time (NRT) snapshot cybersecurity posture level.

13. The non-transitory computer readable storage medium in claim 9, wherein the overall cybersecurity posture level of the operation technology environment includes a near-real-time (NRT) snapshot overall cybersecurity posture level.

14. The non-transitory computer readable storage medium in claim 9, wherein said snapshot cybersecurity posture level comprises a near-real-time (NRT) snapshot cybersecurity posture level for at least one of:

a number of users authorized access to the operation technology environment;

a network security level for the operation technology environment;

a number of cyber awareness sessions performed on the operation technology environment;

a number of cyber drills performed on the operation technology environment;

a number of cybersecurity incidents in the operation technology environment;

a patch compliance ratio for computer resource assets in the operation technology environment;

a backup availability ratio for computer resource assets in the operation technology environment; and an endpoint security compliance ratio for computer resource assets in the operation technology environment.

15. The non-transitory computer readable storage medium in claim 11, wherein effectuating remediation comprises fixing a vulnerability on a computer resource asset in the operation technology environment.

16. The non-transitory computer readable storage medium in claim 11, wherein effectuating remediation comprises guiding, on said computer resource asset, mitigation of a vulnerability on a different computer resource asset in the operation technology environment.

17. A system for monitoring and assessing an overall cybersecurity posture level of an operation technology environment to increase said level when the level is determined to be below a setpoint value, the system comprising:

a first computing device including a cybersecurity posture assessment and remediation (CPAR) stack arranged to receive metrics data for a corresponding one of each of a plurality of cybersecurity posture indices ($CPI_i$) for the operation technology environment, and determine a cybersecurity posture index ($CPI_i$) value for each of the plurality of cybersecurity posture indices ($CPI_i$) based on the metrics data, wherein the $CPI_i$ value is an aggregate of Cybersecurity Indicator Metric values;

compare each $CPI_i$ value to a respective threshold $CPI_{i\text{-}TH}$;

in case a given $CPI_i$ value is less than or equal to the respective threshold $CPI_{i\text{-}TH}$, determine whether to modify the given $CPI_i$ value; and a second computing device including a key performance index (KPI) determiner arranged to in case the given $CPI_i$ value is greater than the respective threshold $CPI_{i\text{-}TH}$, determine a key performance index ($KPIi_{TH}$) value for each of a plurality of key performance indices (KPIi), wherein the KPI is a weighted aggregate of Cybersecurity Indicator Metric values;

determine a key performance index total ($KPI_{TOT}$) value;

compare the $KPI_{TOT}$ value to each $KPI_{iTH}$ value;

in case the $KPI_{TOT}$ value is greater than a given $KPI_{iTH}$ value, determine whether to modify the given $CPI_{iTH}$ value;

in case the $KPI_{TOT}$ value is not greater than a given $KPI_{iTH}$ value, generate a notification message, including image rendering data and commands, send the notification message to a computer resource asset to render an image of a snapshot cybersecurity posture level for at least one of the plurality of cybersecurity posture indices (CPIi), and determine whether to modify the given $CPI_{iTH}$ value.

18. The system in claim 17, wherein the cybersecurity assessment and remediation (CPAR) stack comprises at least one of:

a cybersecurity incidence level metrics (CILM) unit;
a backup Availability Ratio Metrics (BARM) unit;
a Patch Compliance Ratio Metrics (PCRM) unit;
an Endpoint Compliance Ratio Metrics (ECRM) unit;
a Network Security Level Metrics (NSLM) unit;

a Security Awareness Level Metrics (SALM) unit; and
a Drill Compliance Level Metrics (DCLM) unit.

19. The system in claim 17, the system further comprising:
   an operation technology key performance index mitigation unit arranged to effectuate remediation of a vulnerability on a computer resource asset in the operation technology environment to increase said snapshot cybersecurity posture level for the at least one of the plurality of cybersecurity posture indices (CPIi).

20. The system in claim 19, wherein the effectuate remediation comprises guiding remediation of the vulnerability on the computer resource asset.

* * * * *